(12) United States Patent
Bao et al.

(10) Patent No.: US 12,030,484 B2
(45) Date of Patent: Jul. 9, 2024

(54) DRIVING CONTROL METHOD AND APPARATUS, DEVICE, MEDIUM, AND SYSTEM

(71) Applicant: Beijing Baidu Netcom Science and Technology Co., LTD., Beijing (CN)

(72) Inventors: Zewen Bao, Beijing (CN); Zhuhua Zhang, Beijing (CN); Xing Hu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 160 days.

(21) Appl. No.: 17/310,601

(22) PCT Filed: Feb. 13, 2019

(86) PCT No.: PCT/CN2019/074989
§ 371 (c)(1),
(2) Date: Aug. 12, 2021

(87) PCT Pub. No.: WO2020/164021
PCT Pub. Date: Aug. 20, 2020

(65) Prior Publication Data
US 2022/0139222 A1     May 5, 2022

(51) Int. Cl.
*B60W 30/09*    (2012.01)
*B60W 30/095*   (2012.01)
(Continued)

(52) U.S. Cl.
CPC ........ *B60W 30/09* (2013.01); *B60W 30/0956* (2013.01); *B60W 60/005* (2020.02);
(Continued)

(58) Field of Classification Search
CPC . B60W 30/09; B60W 60/005; G01C 21/3815; G08G 1/0116; G08G 1/096708;
(Continued)

(56) References Cited

U.S. PATENT DOCUMENTS 8,700,251 B1   4/2014  Zhu et al.
10,203,699 B1  2/2019  Kim et al.
(Continued)

FOREIGN PATENT DOCUMENTS

CN   107207010 A   9/2017
CN   107807633 A   3/2018
(Continued)

OTHER PUBLICATIONS

Extended European Search Report and Opinion received for European Patent Application No. 19915287.7 mailed on Jun. 1, 2022, 9 pages.
(Continued)

*Primary Examiner* — Peter D Nolan
*Assistant Examiner* — Wae L Louie
(74) *Attorney, Agent, or Firm* — Banner & Witcoff, Ltd.

(57) ABSTRACT

A driving control method, comprising: an external device on a vehicle (130) acquires perception information related to an environment (100) of the vehicle (130), and the perception information comprising at least information related to objects present in the environment (100); and according to the method, a driving-related messages for the vehicle (130) are generated based at least on the perception information, the driving-related messages comprising at least one of a perception message (202), a decision planning message (204), and a control message (206). The method also comprises providing the driving-related messages to the vehicle (130) for driving control of the vehicle (130). Thus, coordinated driving control is achieved by a roadside subsystem (112) of a remote device (120) and a vehicle-mounted subsystem (132) on the vehicle (130). The achievement of the driving control function of the vehicle (130) with the assistance of an external device can realize effective and safe automatic driving. In addition, also provided are an appa-
(Continued)

ratus, a device, a medium, and a system for implementing the control method.

19 Claims, 6 Drawing Sheets

(51) Int. Cl.
| | |
|---|---|
| *B60W 60/00* | (2020.01) |
| *G01C 21/00* | (2006.01) |
| *G08G 1/01* | (2006.01) |
| *G08G 1/0967* | (2006.01) |
| *G08G 1/0968* | (2006.01) |
| *G08G 1/16* | (2006.01) |
| *B60W 10/04* | (2006.01) |
| *B60W 10/10* | (2012.01) |
| *B60W 10/18* | (2012.01) |
| *B60W 10/20* | (2006.01) |
| *G07C 5/00* | (2006.01) |

(52) U.S. Cl.
CPC ....... *G01C 21/3815* (2020.08); *G08G 1/0116* (2013.01); *G08G 1/096708* (2013.01); *G08G 1/096783* (2013.01); *G08G 1/0968* (2013.01); *G08G 1/096805* (2013.01); *G08G 1/166* (2013.01); *B60W 10/04* (2013.01); *B60W 10/10* (2013.01); *B60W 10/18* (2013.01); *B60W 10/20* (2013.01); *B60W 2552/35* (2020.02); *B60W 2554/20* (2020.02); *B60W 2554/402* (2020.02); *B60W 2554/4041* (2020.02); *B60W 2554/4042* (2020.02); *B60W 2554/4043* (2020.02); *B60W 2554/4044* (2020.02); *B60W 2554/4046* (2020.02); *B60W 2555/20* (2020.02); *B60W 2555/60* (2020.02); *B60W 2556/10* (2020.02); *B60W 2556/45* (2020.02); *G07C 5/008* (2013.01)

(58) Field of Classification Search
CPC .......... G08G 1/096783; G08G 1/0968; G08G 1/096805; G08G 1/166
See application file for complete search history.

(56) References Cited

U.S. PATENT DOCUMENTS

| | | | |
|---|---|---|---|
| 10,994,748 B2* | 5/2021 | Mortazavi | B60W 40/04 |
| 2018/0012492 A1 | 1/2018 | Baldwin et al. | |
| 2018/0357905 A1 | 12/2018 | Boss et al. | |
| 2019/0045378 A1 | 2/2019 | Rosales et al. | |
| 2020/0090511 A1* | 3/2020 | Tao | G08G 1/0116 |
| 2020/0262424 A1* | 8/2020 | Kong | B60K 35/28 |
| 2020/0284883 A1* | 9/2020 | Ferreira | G01S 7/4816 |
| 2020/0290638 A1* | 9/2020 | Damnjanovic | G08G 1/164 |
| 2021/0039664 A1* | 2/2021 | Nakamura | G06N 20/00 |
| 2021/0122398 A1* | 4/2021 | Kim | G05D 1/0022 |
| 2021/0155269 A1* | 5/2021 | Oba | H04W 4/44 |
| 2021/0188261 A1* | 6/2021 | Song | B60W 40/105 |
| 2022/0227368 A1* | 7/2022 | Roth | B60L 15/2045 |
| 2022/0244736 A1* | 8/2022 | Konrardy | G06Q 40/08 |

FOREIGN PATENT DOCUMENTS

| | | |
|---|---|---|
| CN | 108010360 A | 5/2018 |
| CN | 108200552 A | 6/2018 |
| CN | 108833833 A | 11/2018 |
| CN | 109196568 A | 1/2019 |
| DE | 102012011888 A1 | 12/2013 |
| DE | 102016211649 A1 | 12/2017 |
| WO | WO-2018028025 A1 | 2/2018 |

OTHER PUBLICATIONS

Extended European Search Report and Opinion received for European Patent Application No. 19914783.6 mailed on Jun. 20, 2022, 28 pages.

Extended European Search Report and Opinion received for European Patent Application No. 19914974.1 mailed on Jul. 4, 2022, 7 pages.

Highway Research Institute of the Ministry of Transport et al., (2017). "Cooperative intelligent transportation system; vehicular communication; application layer specification and data exchange standard," China Automotive Engineering Society, 126 pages.

International Search Report mailed on Oct. 30, 2019 for PCT Application No. PCT/CN2019/074989 filed on Feb. 13, 2019, 7 pages.

Shuliang et al., (2018). "Traffic Safety Early Warning at Intersection Based on Machine Vision and Information Sharing," J Automotive Safety and Energy, 9(2):156-163, English abstract.

* cited by examiner

DRIVING CONTROL METHOD AND APPARATUS, DEVICE, MEDIUM, AND SYSTEM

CROSS REFERENCE TO RELATED APPLICATIONS

This application is a national stage application under 35 U.S.C. § 371 of International Application No. PCT/CN2019/074989, titled "METHOD AND APPARATUS FOR DRIVING CONTROL, DEVICE, MEDIUM, AND SYSTEM", filed on Feb. 13, 2019, the entirety of which is incorporated herein by reference.

TECHNICAL FIELD

Embodiments of the present disclosure mainly relate to a field of driving control, and in particular, to a driving control method and apparatus, a device, a computer-readable storage medium, and a system for coordinated driving control.

BACKGROUND

With the development and progress of science and technology, controlling driving of a transportation means through an automatic control system may bring convenience to people's travel. In recent years, as an application scenario of artificial intelligence, automatic driving (also referred to as unmanned driving) has become a new direction for the development of various transportation means, particularly of the automobile industry. The ability of a transportation means to autonomously drive is becoming increasingly expected. Generally, implementation of autonomous driving may include perceiving a surrounding environment of a transportation means through a sensing device, performing a decision-making plan regarding driving based on a perception result, and controlling a specific driving operation of the transportation means according to the decision-making plan. Therefore, the accuracy and efficiency of any of environment perception, decision planning and control will affect the driving safety and comfort of a transportation means and the operating efficiency of an overall transportation system.

SUMMARY

According to embodiments of the present disclosure, a scheme for driving control is provided.

In a first aspect of the present disclosure, a driving control method is provided. The method includes: acquiring, by an external device of a transportation means, perception information related to an environment of the transportation means, the perception information including at least information related to an object present in the environment; generating a driving-related message for the transportation means based on at least the perception information, the driving-related message including at least one of a perception message, a decision planning message, and a control message; and providing the driving-related message to the transportation means for driving control of the transportation means.

In a second aspect of the present disclosure, a driving control method is provided. The method includes: receiving a driving-related message from an external device of a transportation means, the driving-related message being generated based on perception information related to an environment of the transportation means, and including at least one of a perception message, a decision planning message, and a control message; and controlling driving of the transportation means in the environment based on the driving-related message.

In a third aspect of the present disclosure, a driving control apparatus is provided. The apparatus includes: a perception acquisition module, configured to acquire, by an external device of a transportation means, perception information related to an environment of transportation means, the perception information including at least information related to an object present in the environment; a message generation module, configured to generate a driving-related message for the transportation means based on at least the perception information, the driving-related message including at least one of a perception message, a decision planning message, and a control message; and a message provision module, configured to provide the driving-related message to the transportation means for driving control of the transportation means.

In a fourth aspect of the present disclosure, a driving control apparatus is provided. The apparatus includes: a message receiving module, configured to receive a driving-related message from an external device of a transportation means, the driving-related message being generated based on perception information related to an environment of the transportation means, and including at least one of a perception message, a decision planning message, and a control message; and a driving-related control module, configured to control driving of the transportation means in the environment based on the driving-related message.

In a fifth aspect of the present disclosure, it is provided an electronic device, including: one or more processors; and a storage device for storing one or more programs, wherein the one or more programs, when being executed by the one or more processors, enable the one or more processors to implement the method according to the first aspect of the present disclosure.

In a sixth aspect of the present disclosure, it is provided an electronic device, including: one or more processors; and a storage device for storing one or more programs, wherein the one or more programs, when being executed by the one or more processors, enable the one or more processors to implement the method according to the first aspect of the present disclosure.

In a seventh aspect of the present disclosure, it is provided a computer-readable storage medium having computer programs stored thereon, wherein the computer programs, when executed by a processor, implement the method according to the first aspect of the present disclosure.

In an eighth aspect of the present disclosure, it is provided a computer-readable storage medium having computer programs stored thereon, wherein the computer programs, when executed by a processor, implement the method according to the second aspect of the present disclosure.

In a ninth aspect of the present disclosure, it is provided a system for coordinated driving control, including: a roadside subsystem including the apparatus according to the third aspect; and a vehicle-mounted subsystem including the apparatus according to the fourth aspect.

It should be understood that the content described herein is not intended to denote key or critical elements of embodiments of the present disclosure nor to limit the scope of the present disclosure. Further features of the present disclosure may be readily understood from the following description.

BRIEF DESCRIPTION OF THE DRAWINGS

In conjunction with the drawings and with reference to the following detailed description, the above and other features, advantages and aspects of embodiments of the present disclosure will become more apparent. In the drawings, same or similar reference signs refer to same or similar elements, in which.

DETAILED DESCRIPTION OF THE EMBODIMENTS

Figure 1:
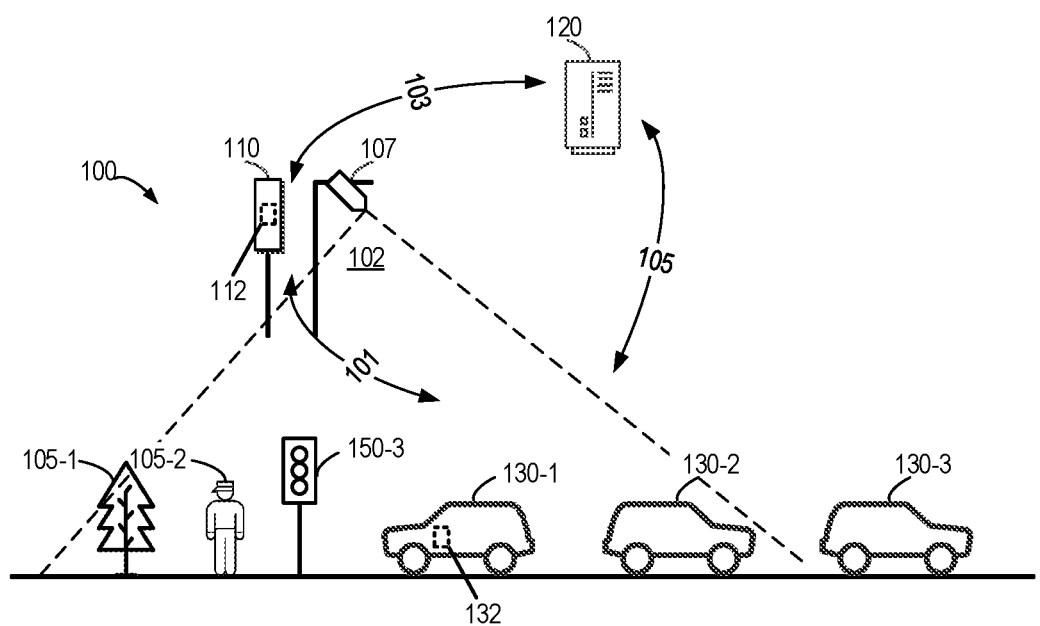
FIG. 1 is a schematic diagram showing an example environment in which a plurality of embodiments of the present disclosure may be implemented.

Embodiments of the present disclosure will be described below in more detail with reference to the drawings. Although some embodiments of the present disclosure are shown in the drawings, it should be understood that the present disclosure can be implemented in various forms and should not be construed as being limited to the embodiments set forth herein. On the contrary, these embodiments are provided for more thorough and complete understanding of the present disclosure. It should be understood that drawings and embodiments of the present disclosure are used for an exemplary purpose only, which are not intended to limit the protection scope of the present disclosure.

In the description of embodiments of the present disclosure, the term of "include" and similar terms thereto should be understood as an open-ended inclusion, i.e., "including but not limited to". The term "based on" should be understood as "at least in part based on". The term "one embodiment" or "the embodiment" should be understood as "at least one embodiment". The terms "first", "second", etc. may refer to different or the same objects. The following text may further include other explicit and implicit definitions.

As mentioned above, environment perception, a decision planning and/or a control are very important aspects in driving control of a transportation means, especially in automatic driving control. In the current field of automatic driving, a vehicle itself is required to be able to perceive a surrounding environment and have computing power to process a perception result and generate operating instructions. However, a driving based on single-vehicle perception is greatly limited. For example, sensing devices and computing devices installed on a vehicle have high manufacturing and maintenance costs while low reuse rates. Restricted by the location and visual field of a vehicle, sensing devices of the vehicle have a limited perception range and are easy to be blocked, thus, it is difficult to obtain a global perception capability. In addition, since the decision planning and the control of a driving are performed from the perspective of a single vehicle, it is impossible to improve overall traffic passage efficiency, or to solve a vehicle passage problem under special circumstances.

According to embodiments of the present disclosure, there is provided an improved driving control scheme, which achieves the driving control of a transportation means based on multi-side coordination. Specifically, a remote device generates at least one of a perception message, a decision-planning message and a control message based on perception information related to an environment. The perception message, the decision-planning message, and/or the control message generated are provided to the transportation means, which achieve a driving control based on the received message.

Embodiments of the present disclosure will be described below in detail with reference to the drawings.

Example Environment

FIG. 1 is a schematic diagram showing an example traffic environment 100 in which a plurality of embodiments of the present disclosure may be implemented. One or more transportation means 130-1, 130-2 and 130-3 are included in the example environment 100. For the convenience of description, the transportation means 130-1, 130-2 and 130-3 are collectively referred to as a transportation means 130. As used herein, a transportation means refers to any type of tool that may carry people and/or things and is movable. In FIG. 1 and other drawings and descriptions herein, the transportation means 130 is shown as a vehicle. A vehicle may be a motor vehicle or a non-motor vehicle, examples of which include but are not limited to a car, a sedan, a truck, a bus, an electro mobile, a motorcycle, a bicycle, etc. However, it should be understood that the vehicle is only an example of the transportation means. Embodiments of the present disclosure are also applicable to other transportation means, such as a ship, a train, an airplane, etc.

One or more transportation means 130 in an environment 100 may be a transportation means with a certain automatic driving capability, which may also be referred to as an unmanned transportation means. Of course, another or some other transportation means 130 in an environment 100 may be those having no automatic driving capability. Such a transportation means may be controlled by a driver. An integrated device or a removable device in one or more transportation means 130 may be capable of communicating with other devices based on one or more communication technologies, for example, communicating with other transportation means or other devices based on communication technologies, such as Vehicle-to-Vehicle (V2V) technology, Vehicle-to-Infrastructure (V2I) technology, Vehicle-to-Network (V2N) technology, Vehicle-to-Everything (V2X) or Internet of Vehicles technology, or any other communication technology.

The transportation means 130 may be equipped with a positioning device to determine its own location. The positioning device may, for example, implement positioning based on any one of the following technologies: a positioning technology based on laser point cloud data, a global positioning system (GPS) technology, a global navigation satellite system (GLONASS) technology, a Beidou navigation system technology, a Galileo positioning system technology, a quasi-zenith satellite system (QAZZ) technology, a base station positioning technology, a Wi-Fi positioning technology, etc.

In addition to the transportation means 130, there may be other objects in an environment 100, such as movable or immovable objects, like animals, plants 105-1, persons 105-2, and transportation infrastructure. The traffic infrastructure includes objects for guiding a traffic passage and indicating a traffic rule, such as traffic signal lights 150-3, a traffic sign (not shown), a road lamp, and so on. Objects outside the transportation means are collectively referred to as out-vehicle objects 105.

In the environment 100, one or more external devices 110 and 120 of the transportation means 130 are further deployed. External devices are usually disposed independently of the transportation means 130 and may be located remotely from the transportation means 130. Herein, a device that is "independent" of the transportation means 130 refers to a device that at least does not move with the movement of the transportation means 130. External devices 110 and 120 may be any device, node, unit, facility, etc. having computing capabilities. As an example, a remote device may be a general-purpose computer, a server, a mainframe server, a network node such as an edge computing node, a cloud computing device such as a Virtual Machine (VM), and any other device that provides computing power.

In an embodiment of the present disclosure, the transportation means 130 may have a wired and/or wireless communication connection with a roadside device 110. For example, one or more transportation means 130 may have a communication connection 101 with the roadside device 110, a communication connection 103 with a remote device 120, and there may also be a communication connection 105 between the roadside devices 110 and 120. Note that for each transportation means 130, a communication connection may be established with one of the roadside devices 110 and 120, or each transportation means 130 may have a communication connection with both of the roadside devices 110 and 120.

Via the communication connection, the roadside device 110 and/or the remote device 120 may master or assist in controlling the driving of one or more transportation means 130 through signaling transmission and reception. For example, a roadside subsystem 112 is integrated/installed/fixed in the roadside device 110, and a vehicle-mounted subsystem 132 is integrated/installed/fixed in the transportation means 130-1. The roadside subsystem 112 and the vehicle-mounted subsystem 132 communicate with each other to implement driving control of the transportation means 130. Although not shown, in addition to the roadside device 110 and the transportation means 130-1, other roadside devices and transportation means may also be equipped with a roadside subsystem 112 and a vehicle-mounted subsystem 132, respectively.

In some embodiments, the roadside device 110 may be deployed near a geographic area where the transportation means 130 is traveling and/or parking, for example, roadside devices may be deployed on both sides of a road at certain intervals, or at a predetermined distance from a location where the transportation means 130 may appear. In some implementations, the communication connection 101 between the transportation means 130 and the roadside device 110 may be based on a short-range communication technology. Of course, the communication connection 101 may also be based on technologies that realize other range communications, and in this respect, the scope of the present disclosure is not limited thereto.

In some embodiments, the remote device 120 may be a networked computing infrastructure. For example, the remote device 120 may be deployed in a cloud or in a computing node in other network environments, such as a remote computing node, a server, or an edge computing device. In a cloud environment, the remote device 120 may sometimes be referred to as a cloud device. The remote device 120 may provide greater computing power, storage capability, and/or communication capability. The communication connection 103 between the remote device 120 and the roadside device 110 and/or the communication connection 105 between the remote device 120 and the transportation means 130 may be based on a long-range communication technology. Although it may not be physically located near the driving area of the transportation means 130, the remote device 120 may still achieve a real-time control and/or a non-real-time control of the transportation means 130 through a high-speed communication connection.

One or more sensing devices 107 are further arranged in the environment 100. The sensing device 107 is arranged independently of the transportation means 130 and is used to monitor the condition of the environment 100, to obtain perception information related to the environment 100. The sensing device 107 may also be referred to as a roadside sensing device. The roadside device 110, especially the one deployed near the driving environment, may have wired and/or wireless communication connections with one or more sensing devices 107. If the communication rate allows, the farther remote device 120 may also be able to communicate with one or more sensing devices 107, or transfer via the roadside device 110. Perception information collected by the sensing device 107 arranged corresponding to the road may also be referred to as roadside perception information. Perception information of the sensing device 107 may be provided to the roadside device 110 having a communication connection. Although shown as mutually independent devices, in some implementations, the sensing device 107 and the roadside devices 110 and 120 may also be partially or fully integrated with each other.

A plurality of sensing devices 107 may be arranged at a certain interval, to monitor a specific geographic range of the environment 100. In some examples, in addition to fixing the sensing device 107 at a specific location, a movable sensing device 107, such as a movable perceiving station, may also be provided. Depending on the perception capability, a perception range of the sensing device 107 is limited. FIG. 1 schematically shows a perception range 102 of the sensing device 107. Objects or phenomena appearing in the perception range 102 may be sensed by the sensing device 107. In the example of FIG. 1, the out-vehicle objects 105-1 to 105-3 and the transportation means 130-1 and 130-2 are all located within the perception range 102 of the sensing device 107. The transportation means 130-3 is not within the perception range 102, and it may not be within the perception range of any sensing device, or it may be within the perception range of any other sensing device not shown. In some cases, the perception ranges of a plurality of adjacently deployed sensing devices 107 may partially overlap.

In order to monitor the environment 100 related to the transportation means 130 more comprehensively, the sensing device 107 may be arranged near the area where the transportation means 130 is traveling and/or parking. As needed, the sensing device 107 may be arranged on a roadside, or a road surface, or deployed at a certain height such as being fixed at a certain height by a support rod. The sensing device 107 may include one or more sensor units, which may be of a same type or different types, and may be distributed at a same location or different locations in the perception range 102.

Examples of the sensor units in the sensing device 107 may include, but are not limited to: an image sensor (such as a camera), a laser radar, a millimeter wave radar, an infrared sensor, a positioning sensor, an illumination sensor, a pressure sensor, a temperature sensor, a humidity sensor, a wind speed sensor, a wind direction sensor, an air quality sensor, etc. An image sensor may collect image information; a laser radar and a millimeter wave radar may collect laser point cloud data; an infrared sensor may use infrared ray to detect environment conditions in an environment; a positioning sensor may collect location information of an object; an illumination sensor may collect measurement values indicating an illumination intensity in an environment; a pressure sensor, a temperature sensor and a humidity sensor may collect measurement values indicating a pressure, a temperature and a humidity, respectively; a wind speed sensor and a wind direction sensor may collect measurement values indicating a wind speed and a wind direction, respectively; an air quality sensor may collect some air quality-related indicators, such as oxygen concentration, carbon dioxide concentration, dust concentration, and pollutant concentration in the air. It should be understood that only some examples of sensor units are listed above. According to actual needs, there may be other types of sensors.

It should be understood that the facilities and objects shown in FIG. 1 are only examples. The type, number, and relative arrangement of objects that appear in different environments may vary. The scope of the present disclosure is not limited in this respect. For example, the environment 100 may have more roadside devices 110 and sensing devices 107 deployed on roadside, to monitor additional geographic locations. Embodiments of the present disclosure may involve a plurality of remote devices 120, or may not involve any remote device 120.

Example System

According to embodiments of the present disclosure, regardless of the automatic driving capability of the transportation means, an external device of the transportation means, including a roadside device or a remote device, is configured to coordinate with the transportation means, to provide a partial or full driving control of the transportation means. The partial or full driving control is achieved by providing a perception message, a decision-planning message and/or a control message to the transportation means. As a result, a roadside subsystem of a remote device and a vehicle-mounted subsystem on a transportation means realize a coordinated driving control. By realizing the function of driving control of a transportation means with the assistance of an external device, effective safe automatic driving may be achieved.

Figure 2:
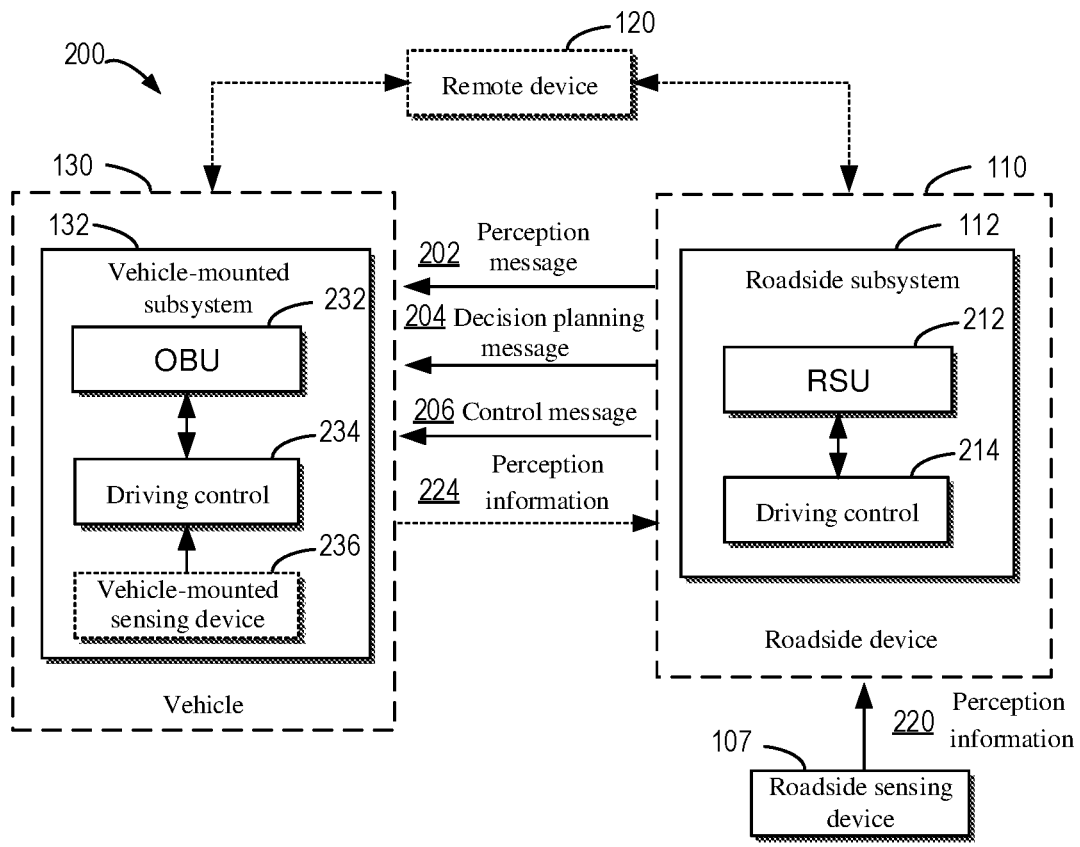
FIG. 2 is a block diagram showing a coordinated driving control system according to some embodiments of the present disclosure.

FIG. 2 is a schematic block diagram showing a coordinated driving control system 200 according to some embodiments of the present disclosure. The system 200 involves the transportation means 130, the roadside device 110, and the roadside sensing device 107 of FIG. 1. In some embodiments, the remote device 120 may also perform a driving control together with or in replacement of the roadside device 110, especially when the communication rate between the remote device 120 and the transportation means 130 allows. Therefore, functions described below for the roadside device 110, especially the roadside subsystem 112, may also be implemented at the remote device 120 accordingly. In some embodiments, a coordinated driving control may also involve traffic infrastructure in a driving environment, such as traffic signal lights 150-3.

As shown in FIG. 2, the roadside subsystem 112 of the roadside device 110 includes a roadside unit (RSU) 212 and a driving control module 214, and the vehicle-mounted subsystem 132 in the transportation means 130 includes an on-board unit (OBU) 232 and a driving control module 234, and optionally includes one or more vehicle-mounted sensing devices 236 arranged in association with the transportation means 130. The RSU 212 is configured to communicate with devices and/or components external to the roadside subsystem 112, and the OBU 232 is configured to communicate with devices and/or components external to the vehicle-mounted subsystem 132.

The driving control module 214 in the roadside subsystem 112 is configured to process driving control-related information and generate a driving-related message to be transmitted by the RSU 212, for driving control of the transportation means 130. The driving control module 234 in the vehicle-mounted subsystem 132 is configured to process driving control-related information, acquire a driving-related message, and control the driving of the transportation means 130 based on an information processing result and/or an acquired driving-related message.

A driving-related message may have any format in conformity with a communication technology used between the roadside subsystem 112 and the vehicle-mounted subsystem 132. The driving-related messages may include at least one of: a perception message 202 indicating an environment perception result, a decision-planning message 204 indicating a decision plan of the transportation means 130 while driving, and a control message 206 indicating a specific driving operation of the transportation means 130 while driving. In terms of order, the information indicated by these three types of messages depends on the information contained in the previous type of message, respectively. For example, a decision plan is based at least on an environment perception result, and a control message is usually made based on a decision plan or an environment perception result. This means that if the perception message 202 and/or the decision-planning message 204 are/is sent to the vehicle-mounted subsystem 132, the vehicle-mounted subsystem 132 needs to perform further processing to obtain a control message, so as to achieve driving control of the transportation means 130.

From the perception message, to the decision-planning message, and then to the control message, the driving control of the transportation means 130 is constantly clarified, and the requirements for the automatic driving control capability on the side of the transportation means 130 is gradually lowered. In the interaction with the vehicle-mounted subsystem 132, the specific type of a driving-related message provided may depend on various triggering factors, such as at least one of a time-based trigger, a location-based trigger, and an event-based trigger.

A time-based trigger may be, for example, broadcasting periodically one or more predetermined types of driving-related messages or sending the same within a specific time period, such as sending a perception message. Transportation means 130 having established a communication connection with the roadside device 110 and being within a communication range may receive a broadcast driving-related message, particularly the perception message 202.

A location-based trigger may be, for example, triggering one or more predetermined types of driving-related messages based on the location of a transportation means 130. It may be determined whether the transportation means 130 is in a predetermined area (e.g., a traffic intersection), in a specific road section, and/or whether a distance from a reference object (e.g., the roadside device 110) is within a predetermined threshold, etc., and a predetermined type of driving-related message is sent when a condition is determined to be satisfied. Under such a triggering condition, the perception message 202, the decision-planning message 204, and/or the control message 206 may be sent.

An event-based trigger may include, for example, a request from the vehicle-mounted subsystem 132. The vehicle-mounted subsystem 132 may send a specific type of a driving-related message according to an instruction of the request. Alternatively or additionally, an event-based trigger may further include detecting an occurrence of a predetermined event related to the transportation means 130. For example, if it is detected that the transportation means 130 is in a dangerous state, a failure state, or a power shortage state, etc., a decision-planning message 204 and a control message 206 may be sent, to deal with the dangerous state and the failure state, and reduce the computation and power consumption at the transportation means 130. Other events that trigger the transmission of one or more driving-related messages may also be defined.

The generation and specific content of each driving-related message will be described below in detail.

Perception Message

Specifically, a RSU 212 in a roadside subsystem 112 is configured to acquire perception information related to a detected environment 100 from one or more environment perception sources, and generate driving-related messages 202, 204 and 206 based on the perception information. The perception information may indicate one or more aspects of the environment 100 and objects present therein, depending on the capability of the environment perception sources. For driving control, perception information includes at least information related to objects present in the environment 100.

An environment perception source may include one or more roadside sensing devices 107 that provide roadside perception information 220 to a roadside subsystem 112. Such a roadside sensing device may provide a better viewing angle of perception and a more comprehensive and accurate environment perception. Due to the presence of a roadside sensing device 107, even when a transportation means 130 has no perception capability, or only has a limited perception capability, and/or has a perception blind zone due to the occlusion of other objects, it may still has roadside-based perception to complete an automatic driving function, thereby realizing a low-cost safe automatic driving.

Alternatively or additionally, an environment perception source may further include a vehicle-mounted sensing device 236 on the transportation means 130, including a target transportation means 130 to be controlled and other transportation means 130, which provide transportation means perception information 224 to a roadside subsystem 112. The type, number, and/or perception capability of a vehicle-mounted sensing device 236 may be the same as or different from the one or more roadside sensing devices 107. In some embodiments, the environment perception source may further include a remote device 120, which may obtain perception information related to an environment 100 from a database and/or other devices. By synthesizing perception information from different environment perception sources, a coordinated perception of an environment 100 may be realized, to perceive the environment 100 more comprehensively. Such coordinated perception may make up for the limitations of one or more aspects of the perception accuracy, the perception perspective, and the perception type of different environment perception sources.

One or more environment perception sources may utilize corresponding types of sensing devices to monitor static and/or dynamic objects in an environment 100, such as pedestrians, cyclists, transportation means, objects protruding from the road surface, etc., and may also detect traffic facilities related to the traffic passage, such as traffic signal lights and traffic sign lights. Alternatively or additionally, environment perception sources may also monitor road surface conditions, road traffic conditions, weather conditions in an environment, geographic areas, monitoring and diagnosis of target transportation means, etc. Perception information obtained by a RSU 212 from an environment perception source may be original perception data collected by a sensing device, partially processed perception data, and/or a perception result. For example, perception information from a vehicle-mounted subsystem 132 may be original perception data, or perception data or perception result partially or completely processed by a driving control module 234.

The obtained perception information is provided to a driving control module 214. The driving control module 214 is configured to perform an analysis based on the perception information. Specifically, the driving control module 214 may be configured to recognize objects that may appear in an environment 100 based on the perception information, and determine information related to the recognized objects. The driving control module 214 may also be configured to determine a perception result of one or more other aspects of an environment 100 and/or the transportation means 130 in the environment 100 based on the perception information. The driving control module 214 may use various data analysis technologies such as a data fusion technology to process perception information. In some embodiments, by analyzing perception information, the driving control module 214 may generate a perception message 202, including an analysis result of the perception information. The perception message 202 may be provided to an OBU 232 in the vehicle-mounted subsystem 132 via the RSU 212.

At the transportation means 130, the driving control module 234 in the vehicle-mounted subsystem 132 may perform a driving control of the transportation means 130 based on the perception message 202. For example, the driving control module 234 may generate a self-vehicle decision plan based on the perception message 202, and control the self-vehicle driving operation based on the generated decision plan. In some embodiments, if the transportation means 130 has an environment perception capability, such as being integrated with an vehicle-mounted sensing device 236, and/or may obtain perception information from devices other than the roadside device 110 (e.g., other transportation means 130), then the driving control module 234 may perform a driving control of the transportation means 130 based on the perception message 202 received from the RSU 212 together with other perception information. The sources of different perception messages/information may be processed through technologies such as data fusion. In some embodiments, if a transportation means 130 has no environment perception capability, the driving control module 234 may directly use a received perception message 202 as an input of a decision control of the transportation means 130.

Depending on the source and specific content of perception information, the perception message 202 may include indication information related to an environment 100 and/or one or more other aspects of transportation means 130 in the environment 100. In some embodiments, the perception message 202 may include following information related to one or more aspects: information related to an obstacle present in the environment 100, for indicating at least one of a type, location information, speed information, direction information, physical appearance descriptive information, a historical trajectory, and a predicted trajectory of the obstacle; information related to a physical condition of a road in the environment 100, for indicating at least one of a road surface physical condition of the road and structured information of the road; information related to a traffic facility in the environment 100, for indicating at least one of a state of a signal light and a traffic sign on the road; information related to a road traffic condition in the environment 100, for indicating at least one of a sign, traffic flow and a traffic event related to the road and/or a lane in the road; and information related to a weather condition in the environment 100. In some embodiments, the perception message 202 may further include auxiliary information related to positioning of the transportation means 130, diagnosis information of a failure of the transportation means 130, information related to an Over-The-Air (OTA) of a software system of the transportation means 130, and/or time information.

In some embodiments, the perception message 202 may further include map information which may indicate, for example, at least one of an identification of a map, an update mode of the map, an area of the map to be updated and location information. Map information may indicate a high-precision map that meets the requirement of an automatic driving scenario. The identification of a map may include, for example, a version number of the map, an update frequency of the map, etc. The update mode of a map may indicate, for example, an update source (from a remote device 120 or other external sources), an update link, update time, etc., of the map.

In some embodiments, the perception message 202 may further include information related to a parking area of the transportation means 130. When the transportation means 130 has a parking intention, for example, when it is detected that the transportation means 130 approaches to a predetermined parking geographic area or initiates a parking request, the perception message 202 may include information related to the parking area of the transportation means 130. Certainly, in some embodiments, information related to a parking area of the transportation means 130 may always be included in the perception message 202 without a determination of parking intention. The information related to a parking area may include information related to a parking spot (e.g., parking space) in the parking area, information of an obstacle in the parking area, etc. In some embodiments, the information related to a parking area may include, for example, a predetermined serial number of a parking spot in the parking area, location information of a parking spot, a physical state description of a parking spot, an idle state of a parking spot, and/or entrance and exit information of the parking area.

In some embodiments, information related to a parking area may be provided, for example, from a remote device 120 to a roadside device 110. The roadside device 110 makes the information included in a perception message 202 and provides to the transportation means 130, to assist the transportation means 130 for finding a suitable parking spot as soon as possible. In some embodiments, the roadside device 110 may also make the information related to a parking area not included in the perception message 202, but generate a subsequent decision-planning message 204 and/or a control message 206 based on such information, to control the driving and/or parking of the transportation means 130 in the parking area.

For the convenience of understanding, some specific examples and descriptions of different types of information in a perception message 202 are given below in Table 1.

TABLE 1

| indication information | specific content | unit | remarks |
|---|---|---|---|
| Perception Message (RSU→OBU) | | | |
| time information | current moment | ms | |
| information related to an obstacle | type of an object | character | pedestrian/cyclist/motorized vehicle/non-motorized vehicle/static object, which may be further subdivided according to an authority of an object (e.g., rescue, construction, command, etc.), a passing request, an object identification or a signboard, and an appearance of an object (e.g., color, size), etc. |
| | location information of an object | deg | location information may be uniformly represented by points in a specific coordinate system that may be any geocentric coordinate system, parametric coordinate system, and coordinate system after translation and rotation. When describing a point in a coordinate system, it may be actual original data and converted data (e.g., data for performing parameter integralization) of the coordinate system. For example, location information of GPS data may be described with latitude, longitude, and altitude data |
| | description of an object | | description of a size (e.g., length, width, height), a color, corner point data, a center point, a ground clearance, etc., of an object |
| | speed | m/s | |
| | speed direction | deg | it may form a clockwise angle with true north |
| | acceleration | m/s$^2$ | |

TABLE 1-continued

Perception Message (RSU→OBU)

| indication information | specific content | unit | remarks |
|---|---|---|---|
| | acceleration direction | deg | it may form a clockwise angle with true north |
| | historical trajectory | | motion trajectory of an object in a past time period |
| | predicted trajectory | | predicted motion trajectory of an object in a future time period |
| information related to a physical condition of a road | road surface physical condition | | whether a road surface has potholes or accumulated water or dust, whether a road surface is maintained, or is closed, etc. |
| | structured information of a road | | a ramp indication of a road (e.g., a distance, a turning radius, the number of lanes, etc., of a ramp), a type of a road (highway, ordinary road), the number of lanes of a road |
| information related to traffic facilities | state of a signal light | integer | states of various indicator lights in signal light facilities |
| | traffic signs | | signs indicating road passage rules, e.g., a speed limit sign, a height limit sign, and a steering restriction sign |
| information related to road traffic conditions | traffic flow of a road | | density, speed, queue length, etc., of vehicles on a road |
| | traffic flow of a lane | | density, speed, and queue length of vehicles on each lane, when a road has a plurality of lanes |
| | signs of a road | | |
| | signs of a lane | | |
| | traffic events | | events, such as traffic accidents and road maintenance, on a specific road or a specific lane |
| information related to weather conditions | weather conditions | | indicating weather of various aspects, e.g., a temperature, a moderation, an air pollution level, an illumination, etc. |
| auxiliary information related to positioning | auxiliary positioning information | | assisting transportation means for more accurate positioning |
| diagnosis information of a failure | diagnosis result | | diagnosis information of failures in hardware, software and other components of transportation means |
| information related to OTA | OTA data | | for updating one or more software systems of transportation means |
| map information | map data | | indicating at least one of an identification of a map, e.g., a high-precision map used, an update mode of the map, an area of the map to be updated, and location information |
| information related to a parking area | predetermined serial number of a parking spot | | a parking area is pre-divided into one or more parking spots with predetermined serial numbers |
| | location information of a parking spot | | accurate positioning of a parking spot, such as a location at a center of the parking spot |
| | physical state description of a parking spot | | a size of a parking spot, e.g., may be described with length and width, or with corner point data, and/or may include a shape of the parking spot, etc. |
| | idle state of a parking spot | | the number of idle parking spots |
| | entrance and exit information of a parking area | | locations of entrance and exit, and/or a route indication |

Although some examples of the content contained in a perception message 202 are listed above, it should be understood that the perception message 202 may further include other content, including less or more content. In each communication, the perception message 202 provided from a roadside subsystem 112 to a vehicle-mounted subsystem 132 may be all or part of the above content in Table 1, or it may include other content. During transmission, the perception message 202 or constituent elements therein may be, for example, data-compressed, to further reduce the amount of data transmitted between the roadside and the transportation means.

Decision Planning Message

A decision planning message 204 may be generated by a driving control module 214 of a roadside subsystem 112 based on perception information. The driving control module 214 processes the perception information, determines a perception result, and generates the decision planning message 204 based on the perception result. When a decision plan is performed, the driving control module 214 may determine to perform the plan according to a level of a road or a lane, and perform a unified plan for transportation means 130 on a same road or a same lane. In addition, the driving control module 214 may also perform a plan according to a level of the transportation means. Due to more comprehensive perception information of an environment 100, the roadside subsystem 112 may consider the conditions of all of the transportation means or traffic participants in a certain geographic area, to determine a more reasonable decision plan.

In some embodiments, when it is determined that the roadside end is required to intervene in the driving decision or plan of a transportation means 130, or when the roadside subsystem 112 takes over the driving control of a transportation means 130 (e.g., according to a geographic area, upon a request of the transportation means 130, or after obtaining a permission of the transportation means 130), the roadside subsystem 112 provides a decision planning message 204 to a vehicle-mounted subsystem 132. The decision planning message 204 may be, for example, provided to the vehicle-mounted subsystem 132 in real time, or at a smaller time interval (which may depend on the moving speed of the transportation means 130).

At the transportation means 130, the driving control module 234 in the vehicle-mounted subsystem 132 may perform a driving control of the transportation means 130 based on a decision planning message 204. For example, the driving control module 234 may generate self-vehicle control information based on the decision planning message 204, to indicate specific driving operations of the transportation means 130. In some embodiments, the vehicle-mounted subsystem 132, such as a driving control module 234 therein, may determine whether to use the decision planning message 204 to control the transportation means 130. In a case where a decision planning message 204 is not used, it may be discarded. In a case where a decision planning message 204 needs to be used, the driving control module 234 may fully comply with a decision plan for the transportation means 130 indicated in the decision planning message 204, to formulate a local decision plan, or alternatively, in conjunction with a local strategy and with reference to the decision plan indicated by the message 204, to formulate a local decision plan. Embodiments of the present disclosure are not limited in this respect.

The roadside subsystem 112 may achieve a global environment perception through various environment perception sources, including, but not limited to, information related to a road traffic condition, information related to a road physical state, information of infrastructures, map information, etc., and during the driving planning of the transportation means 130, road resources may be used more reasonably and effectively, to ensure safer and more effective driving.

In some embodiments, the decision planning message 204 may include following information related to one or more aspects: an indication of a travelling road on which a decision is to be applied, start time information and/or end time information of a decision plan, start location information and/or end location information of a decision plan, an identification of a transportation means targeted by a decision plan, decision information related to a driving behavior of a transportation means, decision information related to a driving action of a transportation means, information of a trajectory point of a route plan, expected time for arriving at a trajectory point of a route plan, information related to other transportation means involved in the decision plan, map information, time information, etc. The map information may indicate, for example, at least one of an identification of a map, an update mode of a map, an area of a map to be updated, and location information. The identification of a map may include, for example, a version number of a map, an update frequency of a map, etc. The update mode of a map may indicate, for example, an update source of the map (from a remote device 120 or other external sources), an update link, update time, etc.

For the convenience of understanding, some specific examples and descriptions of different types of information in a decision planning message 204 are given below in Table 2.

TABLE 2

| Decision Planning Message (RSU→OBU) | | |
|---|---|---|
| indication information | specific content | remarks |
| time information | current moment | |
| indication of a travelling road on which a decision is to be applied | a road/lane corresponding to a road/lane level decision | pedestrian/cyclist/transportation means/ obstacle therein are considered |
| start time information of a decision plan | start time | indicating to a transportation means when to start an indicated decision plan |
| end time information of a decision plan | end time | indicating to a transportation means when to end an indicated decision plan |
| start location information of a decision plan | start location indication | indicating to a transportation means where to start an indicated decision plan |
| end location information of a decision plan | end location indication | indicating to a transportation means where to end an indicated decision plan |
| identification of a transportation means targeted by a decision plan | identification of a transportation means | a decision plan may be targeted to one or more transportation means, while other transportation means may ignore a received decision strategy |
| decision information related to a driving behavior | behavior-level decision | behaviors, e.g., following a transportation means ahead, stopping, allowing right of way, turning left, turning right, etc. |
| decision information related to a driving action | action-level decision | decision information, e.g., trajectory points of a route plan, time, a speed (it may form a clockwise angle with the true north), an acceleration, an angle, etc.; feedback control of a transportation means, including a throttle control, speeding up, braking, a steering wheel rotation and other actions |
| information related to a trajectory of a route plan | information of trajectory points of a route plan | it may be described with map data or longitude and latitude information |
| | expected time for arriving at trajectory points of a route plan | planning expected time for arriving at one or more trajectory points |

TABLE 2-continued

Decision Planning Message (RSU→OBU)

| indication information | specific content | remarks |
| --- | --- | --- |
| information related to other transportation means | location of other transportation means | |
| | related information of other transportation means | identification, descriptive information, right-of-way information, etc., of other transportation means |
| map information | map data | indicating at least one of an identification of a map, e.g., a high-precision map used, an update mode of the map, an area of the map to be updated, and location information. |

Although some examples of the content contained in a decision planning message 204 are listed above, it should be understood that the decision planning message 204 may further include other content, including less or more content. In each communication, the decision planning message 204 provided from a roadside subsystem 112 to a vehicle-mounted subsystem 132 may be all or part of the above content in Table 2, or it may include other content. During transmission, the decision planning message 204 or constituent elements therein may be, for example, data-compressed, to further reduce the amount of data transmitted between the roadside and the transportation means.

Control Message

A control message 206 may be generated by a driving control module 214 of a roadside subsystem 112 based on decision planning information. The control message 206 may specify a specific driving operation on a transportation means 206.

In some embodiments, when it is determined that the roadside end is required to intervene in the driving decision or plan of a transportation means 130, or when the roadside subsystem 112 takes over the driving control of a transportation means 130 (e.g., according to a geographic area, upon a request of the transportation means 130, or after obtaining a permission of the transportation means 130), the roadside subsystem 112 provides a control message 206 to a vehicle-mounted subsystem 132. The control message 206 may be, for example, provided to the vehicle-mounted subsystem 132 in real time, or at a smaller time interval (which may depend on the moving speed of the transportation means 130).

At the transportation means 130, the driving control module 234 in the vehicle-mounted subsystem 132 may perform a driving control of the transportation means 130 based on a control message 206. For example, the driving control module 234 may determine a specific driving operation on the transportation means 130 based on the control message 206. In some embodiments, the vehicle-mounted subsystem 132, such as a driving control module 234 therein, may determine whether to use the control message 206 to control the transportation means 130. In a case where a control message 206 is not used, it may be discarded. In a case where a control message 206 needs to be used, the driving control module 234 may fully comply with a control operation for the transportation means 130 indicated in the control message 206, to determine a local control operation, or alternatively, in conjunction with a local strategy and with reference to the control operation indicated by the message 206, to determine a local control operation. Embodiments of the present disclosure are not limited in this respect.

The roadside subsystem 112 may achieve a global environment perception through various environment perception sources, including, but not limited to, information related to a road traffic condition, information related to a road physical state, information of infrastructures, map information, etc., and during the formulation of a control operation on the transportation means 130, road resources may be used more reasonably and effectively, to ensure safe traveling of an automatic driving vehicle under special needs.

In some embodiments, the control message 206 may include following information related to one or more aspects: kinematic control information related to a motion of the transportation means, kinetic control information related to at least one of a power system, a transmission system, a brake system and a steering system of the transportation means, control information related to a ride experiences of a passenger in the transportation means, control information related to a traffic warning system of the transportation means, and time information.

For the convenience of understanding, some specific examples and descriptions of different types of information in a control message 206 are given below in Table 3.

TABLE 3

Control Message (RSU→OBU)

| indication information | specific content | remarks |
| --- | --- | --- |
| time information | current moment | |
| kinematic control information | motion direction of a transportation means | indicating a motion direction |
| | speed of a transportation means | indicating a motion speed |
| | acceleration of a transportation means | indicating a motion acceleration |
| | kinematic correction | indicating a kinematic correction of a transportation means |

TABLE 3-continued

Control Message (RSU→OBU)

| indication information | specific content | remarks |
|---|---|---|
| kinetic control information of a transportation means | related control of a power system | involving components of an engine, such as an internal combustion engine, a motor, wheels and the like, and indicating whether to output |
| | related control of a transmission system | indicating a gear, whether to cut off the power, parking, forwarding and/or reversing, and indicating a torque and a wheel speed of each driving wheel |
| | related control of a brake system | indicating one or more aspects of in a braking control system: a torque of each wheel, a braking force distribution, and parking |
| | related control of a steering system | indicate a steering angle of each wheel, etc. |
| control information related to a ride experience | involving a control of riding comfort | for example, an adjustment of a suspension in a transportation means |
| control information related to a traffic warning system | indication of each component of a traffic warning system | control of warning components of a vehicle in one or more aspects such as lighting, steering and whistling |

Although some examples of the content contained in a control message 206 are listed above, it should be understood that the control message 206 may further include other content, including less or more content. In each communication, the control message 206 provided from a roadside subsystem 112 to a vehicle-mounted subsystem 132 may be all or part of the above content in Table 2, or it may include other content. During transmission, the control message 206 or constituent elements therein may be, for example, data-compressed, to further reduce the amount of data transmitted between the roadside and the transportation means.

Auxiliary Information from Transportation Means

In some embodiments, as mentioned above, a vehicle-mounted subsystem 132 at the transportation means 130 may further provide transportation means perception information 224 to a roadside subsystem 112 for the use by a driving control module 214 to generate a driving-related message. The transportation means perception information 224 may be directly transmitted by an OBU 232 to a RSU 212, or it may be processed to generate a perception message in a certain format.

A perception message provided by the vehicle-mounted subsystem 132 includes information related to an environment detected by a vehicle-mounted sensing device 236, and the types of content therein may include one or more of the types of the content in the perception message 202 from the roadside subsystem 112 to the vehicle-mounted subsystem 132. In some embodiments, a perception message provided by the vehicle-mounted subsystem 132 may include information related to an obstacle present in an environment 100, to indicate at least one of a type, location information, speed information, direction information, physical appearance descriptive information, a historical trajectory, and a predicted trajectory of the obstacle. In some embodiments, a perception message provided by the vehicle-mounted subsystem 132 may alternatively or additionally information related to a weather condition in an environment; auxiliary information related to positioning of the transportation means 130, such as information related to a road traffic condition in the environment; diagnosis information on a failure of the transportation means 130; information related to an OTA upgrade of a software system in the transportation means 130; and/or information related to a parking area of the transportation means 130.

The information related to a parking area of the transportation means 130 may be detected by a vehicle-mounted sensing device 236, when the transportation means 130 approaches to the parking area. Regarding the characteristics of a parking area, the vehicle-mounted subsystem 132 may determine, based on perception information of the sensing device 236, a predetermined serial number of a parking spot in the parking area, location information of the parking spot and/or an idle state of the parking spot, etc., as information related to the parking area. Through the information related to the parking area provided by the vehicle-mounted subsystem 132, the driving control module 214 in the roadside subsystem 112 may more accurately control the driving and/or parking of the transportation means 130 in the parking area.

Example types of specific content contained in perception messages from the transportation means 130 (e.g., the OBU 232) to the roadside device 110 (RSU 212) may refer to the perception message 202 shown in Table 1. Of course, it should be understood that it is unnecessary to include all of the types listed in the perception message 202, and in some embodiments, other types of information may also be indicated.

In some embodiments, in addition to the transportation means perception information 224 or alternatively, a roadside subsystem 112 may further acquire other types of information that a transportation means 130 may provide (e.g., received by a RSU 212 from an OBU 232). The acquired information may serve as auxiliary information for a driving control module 214 of a roadside subsystem 112 to determine a decision planning message 204 and/or a control message 206. Such auxiliary information may be generated and transmitted in any message format.

In some embodiments, a roadside subsystem 112 may acquire, for example, real-time running information of a transportation means 130. The real-time running information is related to a current running condition of the transportation means 130, and may include, for example, at least one of location information, traveling direction information, traveling route information, traveling speed information, operation state information, and component state information of the transportation means 130. In some embodiments, auxiliary information acquired from a vehicle-mounted subsystem 132 may also include auxiliary planning information of the transportation means 130, which indicates planning conditions of the transportation means 130. The auxiliary planning information may include, for example, at least one of an indication of traveling intention, planned traveling route information, and speed limit information of the transportation means 130.

Alternatively or additionally, auxiliary information acquired from a vehicle-mounted subsystem 132 may further include vehicle body information of a transportation means 130, to describe a physical state, an appearance state, etc., of the transportation means 130 per se. The vehicle body information may include, for example, at least one of identification, type, descriptive information, current traveling route information, and failure-related information of the transportation means 130. In addition, the auxiliary information may further include, for example, at least one of a special transportation means type and a right-of-way requirement level.

For the convenience of understanding, some specific examples and descriptions of the content indicated by an auxiliary message are given below in Table 4.

TABLE 4

| \multicolumn{3}{c}{Auxiliary Information (OBU→RSU)} |||
|---|---|---|
| indication information | specific content | remarks |
| real-time running information | location information of a transportation means | location information may be uniformly represented by points in a specific coordinate system that may be any geocentric coordinate system, parametric coordinate system, and coordinate system after translation and rotation. When describing a point in a coordinate system, it may be actual original data and converted data (e.g., data for performing parameter integralization) of the coordinate system. For example, location information of GPS data may be described with latitude, longitude, and altitude data |
| | information of a travelling direction | direction information may be uniformly described with a deflection angle of an object (such as, a transportation means) relative to a static position. The direction information may be original data or converted data (parameter integerization) of an angle |
| | information of a travelling route | it may be described with a collection of location information of a transportation means at each node of a route |
| | information of a travelling speed | including information related to a speed and/or an acceleration of the transportation means, such as a three-axis acceleration, an angular velocity, etc. |
| | information of an operation state | light setting: indicating a state of each light, including such as steering lights, dipped headlights, headlights on full beam; state of a steering wheel: indicating an angle of a steering wheel, the angle is described with a deflection angle relative to a horizontal direction, in actual implementation, it may be original data or converted data (parameter integerization) of the angle; brake state: indicating whether to brake, a description of a braking force, which may be divided into different levels for indication |
| | state information of a component | including state information of a vehicle body control component, a vehicle body sensing component, a display component, and/or other components on a vehicle, to indicate whether these components are in a good, alarm, or damaged state |
| auxiliary planning information | indication of travelling intention | indicating travelling intention of a transportation means, such as turning left, turning right, turning around, forwarding, outbound, inbound, etc. |
| | planned travelling route information | it may be described with a collection of location information at each node of a route |
| | speed limit information | indicating a maximum speed and acceleration allowed by a transportation means, which may be indicated by means of a speed, an angular velocity, etc. |
| vehicle body information of a transportation means | identification | information capable of uniquely identifying a transportation means, which may be a vehicle identification number (VIN) code, a license plate number, etc. |
| | type | indicating a basic type of a transportation means; types of transportation means may be classified according to different dimensions, e.g., transportation means classification standards, industry applications, power and/or driving modes; when transportation means are described, there may be multiple dimensions of information, for example, with respect to a right-of-way distribution, transportation means may be classified into ordinary transportation means, public transportation means and emergency vehicles; and in a scenario of parking, transportation means may be classified into a C-class vehicle, a B-class vehicle, an SUV, a large-scale vehicle, etc. |
| | descriptive information | description of a size (e.g., length, width, height), a color, corner point data, a center point, a ground clearance, etc., of a transportation means; for example, the center point of a transportation means may be used as a reference to describe the length, width and height; or corner points may be used for description (corner point data may still be described with location information) |

TABLE 4-continued

Auxiliary Information (OBU→RSU)

| indication information | specific content | remarks |
| --- | --- | --- |
| special transportation means indication information | current traveling route information | it may be described with a collection of location information of a transportation means at each node of a route |
| | failure-related information | when a component of a transportation means fails, it may indicate or describe the failed portion, and/or indicate a failure diagnosis result, etc. |
| | special transportation means type | indicating a basic type of a special transportation means; types of special transportation means may be classified according to different dimensions, e.g., transportation means classification standards, industry applications, power and/or driving modes, etc.; when special transportation means are described, there may be multiple dimensions of information, for example, special transportation means may be classified into a fire truck, an emergency vehicle, a police car, a road rescue vehicle, etc., according to industry applications |
| | right-of-way requirement level | indicating requirements of special transportation means for right-of-way, under normal circumstances, special transportation means have a priority of starting (the right-of-way may be classified into different levels, and different types of transportation means correspond to different levels of right-of-way |

Although some examples of the content contained in auxiliary information are listed above, it should be understood that auxiliary information may further include other content, including less or more content. In each communication, the auxiliary information provided from a roadside subsystem 112 to a vehicle-mounted subsystem 132 may be all or part of the above content in Table 4, or it may include other content. During transmission, auxiliary information, or constituent elements therein from a transportation means may be, for example, date-compressed, to further reduce the amount of data transmitted between the roadside and the transportation means.

The coordinated driving control system and some examples of message interaction and message composition therein are described above. In different scenarios, message interactions between a roadside subsystem 112 and a vehicle-mounted subsystem 132 for implementing coordinated driving control may be different, and there may also be other information interactions. Implementations of coordinated driving control on the roadside, the vehicle side, and possibly the cloud will be described below with reference to some example scenarios.

Example Scenario at an Intersection

Generally, in the presence of signal lights, a vehicle with an automatic driving capability may obtain a current state of a signal light through perception means, and pass through an intersection in accordance with a traffic rule of "stop at red light and walk when it turns green". At an intersection where there is no signal light, each automatic driving vehicle may only rely on its own decision control, resulting in a low passage efficiency.

In some embodiments of the present disclosure, in some environments of complicated traffic roads, such as at an intersection, a road section where congestion occurs frequently, or a road section with frequent traffic accidents recognized by the traffic department, an external device such as a roadside device 110 may perceive road traffic conditions of a surrounding road based on roadside perception information and perception information possibly from other sources, and perform a global driving control of passages of the vehicle according to global road traffic conditions, in this way, a passage strategy may be improved, thereby achieving a more effective, reasonable and safer driving control.

Figure 3A:
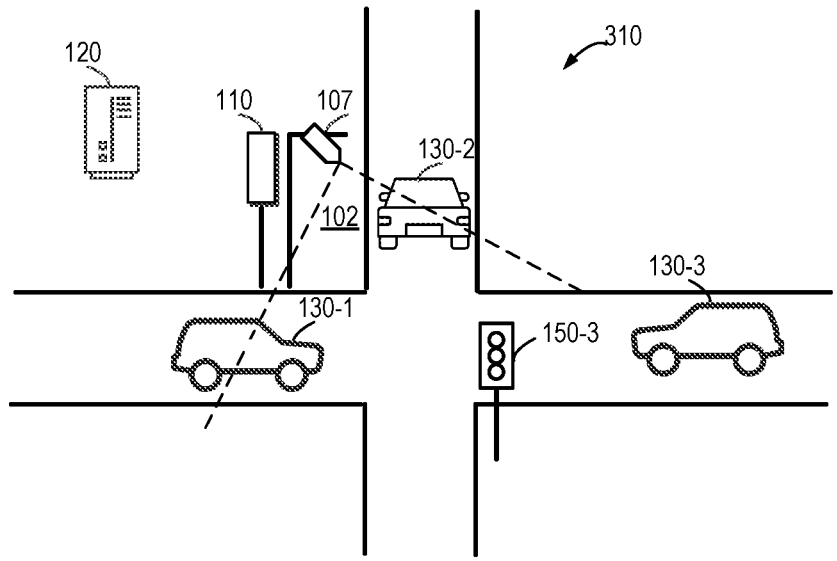
FIG. 3A to FIG. 3C are schematic diagrams showing example scenarios of a coordinated driving control according to some embodiments of the present disclosure.

FIG. 3A shows a coordinated driving control in an example scenario 310 at an intersection. In this scenario, a plurality of transportation means (i.e., vehicles) 130 are traveling toward an intersection. An OBU 232 of a vehicle-mounted subsystem 130 may transmit transportation means perception information 224 to a roadside subsystem 112 of a roadside device 110, and may also transmit one or more auxiliary information, such as real-time running information, auxiliary planning information, vehicle body information, and special transportation means indication information. Within a communication range, a RSU 212 of the roadside subsystem 112 receives information transmitted by the OBU 232, receives information of a roadside sensing device 107 and possible information from a remote device 120, and provides the received information to a driving control module 214, to generate driving-related messages. If generated driving-related messages include a perception message 202, an environment perception result indicated in the perception message 202 may be more accurate and comprehensive than an environment perception result sensed by a single transportation means 130.

Since an external device, such as a roadside device, may obtain, from a roadside perception device and possibly other environment perception sources, comprehensive environment perception information, including perception data such as pedestrians, vehicles, cyclists, and road surface information in the environment, the environment perception capability may be further improved, and then the accuracy of subsequent decision planning and control may be improved.

In some embodiments, since the traffic passage at an intersection may involve a global plan of a plurality of transportation means, a driving control module 214 of a roadside subsystem 112 may generate a decision planning message 204 based on information from a plurality of sources, to perform a decision planning on a road, a lane, or a vehicle level, in order to achieve effective and reasonable intersection passage. The decision planning message 204 may be transferred to a vehicle-mounted subsystem 232 in a time period during which or within a starting location at which a transportation means 130 is determined as under a roadside control. In some embodiments, the driving control module 214 may directly generate a control message 206, to indicate a specific control operation on the transportation means 130, and then a RSU 212 provides the control message 206 to an OBU 232.

After receiving the decision planning message 204, the transportation means 130 may control the transportation means 130 according to a decision planning strategy indicated in the decision planning message 204, to ensure that the transportation means 130 is driven according to the decision planning strategy of the roadside subsystem 112. After receiving the control message 206, the transportation means 130 may control an operation on the transportation means 130 according to the control operation indicated by the control message 206.

In some embodiments, the roadside subsystem 112 may also control traffic signal lights 150-3 on the roadside, to jointly implement a communication strategy. In some embodiments, the decision planning of the roadside subsystem 112 may also be implemented on roads without signal lights, to allow the safe and efficient passage of transportation means.

Example Scenario of Takeover of Transportation Means

An application of a decision control message 204 or a control message 206 means that the partial driving control or full driving control of a transportation means 130 will be performed by an external device, such as a roadside device 110. In some embodiments, such partial driving control or full driving control is activated only when it is determined that the roadside device 110 may take over the transportation means 130. A takeover of the transportation means 130 may be caused by many reasons. For example, it may be because the transportation means 130, in particular, the transportation means 130 in an automatic driving mode, cannot deal with a current driving scenario, such as a software and/or hardware failure, and a normal driving requires a coordinated operation with other transportation means (e.g., a travel is stopped since the transportation means is besieged by surrounding vehicles), etc. At this time, the intervention of a roadside vehicle may help the transportation means 130 "get out of trouble" without manual intervention, which improves the automatic running capability of an automatic driving transportation means. Of course, in some cases, the transportation means 130 may request a takeover by a roadside device 110 for any other reason, for example, in order to realize automatic parking, etc.

Figure 3B:
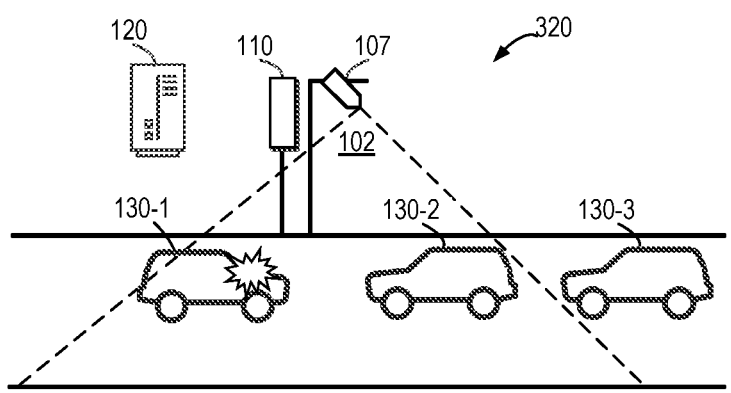

FIG. 3B shows a coordinated driving control under an example scenario 320 of taking over a transportation means 130. In this scenario, the transportation means 130-1 fails, e.g., the driving control module fails, so an automatic driving is stopped on the road. In response to such an event, the vehicle-mounted subsystem 132 in the transportation means 130-1 may send a takeover request message to a roadside subsystem 112, to request a takeover of the driving control of the transportation means 130. The driving control module 214 of the roadside subsystem 112 may thus provide a control message 206 to the transportation means 130-1. In some embodiments, if part of driving control modules of the transportation means 130-1 fail, the takeover request message may only request a partial takeover of the driving control of the transportation means. In response to such a takeover request message, the driving control module 214 may provide a decision planning message 204, so that the transportation plan 130-1 may drive according to the decision plan. Of course, in this case, the driving control module 214 may also provide a control message 206, to provide an overall control of the driving of the transportation means 130-1.

Figure 3C:
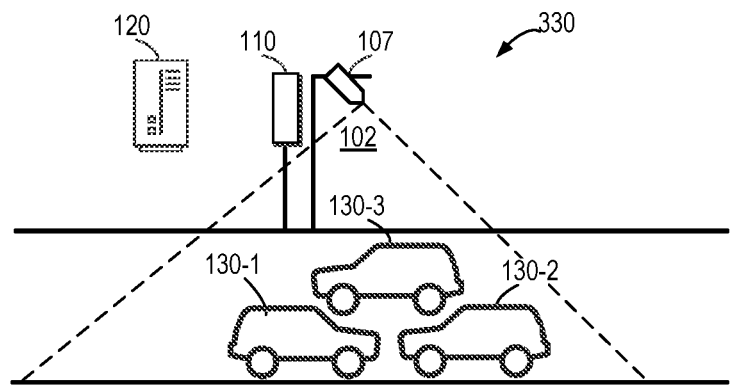

FIG. 3C further shows a coordinated driving control under an example scenario 330 of taking over a transportation means 130. In this scenario, the transportation means 130-1 is blocked by other surrounding transportation means 130-2 and 130-3 and cannot leave the predicament through a self-vehicle automatic driving decision. At this time, a vehicle-mounted subsystem 132 in the transportation means 130-1 may send a takeover request message to a roadside subsystem 112, to request a partial or full takeover of the driving control of the transportation means 130. A driving control module 214 of the roadside subsystem 112 may thus provide a decision planning message 204 and/or a control message 206 to the transportation means 130-1 for driving control. In addition, through the perception information received from each of the perception information sources, the driving control module 214 determines that a smooth driving of the transportation means 130-1 requires a coordination with one or more other transportation means 130. For example, the driving control module 214 determines that the transportation means 130-1 cannot bypass the transportation means 130-2 to continue advancing, and the transportation means 130-2 is required to get out of the way for a certain space. Thus, the driving control module 214 further generates another decision planning message and/or another control message based on existing information. A RSU 212 then provides the generated decision planning message and/or control message to the transportation means 130-2. The transportation means 130-2 may perform corresponding driving action according to the received message, so that the transportation means 130-1 is coordinated with to leave the current blocked state.

In some embodiments, a takeover request message indicates identification information of transportation means, travelling plan information of the transportation means, a reason for requesting takeover, and time information. The identification information of transportation means enables a roadside device 110 to identify and/or position the transportation means 130. The identification information may include, for example, an identification of a vehicle, such as a VIN code, a license plate number, and may further include a type, a size, descriptive information and location information of the vehicle, a description of surrounding objects, etc. The travelling plan information indicates a travelling plan of a transportation means 130, including but not limited to, a current travelling direction, a destination, a planned travelling route, and speed limit information (e.g., a maximum allowable speed and/or acceleration). The reason for requesting takeover may indicate, for example, a reason why a transportation means 130 requests a takeover, such as a self-vehicle failure, a specific demand (e.g., automatic parking), a failure of an automatic driving strategy.

In some embodiments, a roadside device 110 or other traffic management nodes may also actively request or require the roadside device 110 to take over one or more transportation means 130, when it is detected a need of takeover or it is facing an emergency situation. In some embodiments, in response to a takeover request message or if the roadside subsystem 112 actively determines to take over the driving control of the transportation means 130 at least in part, a RSU 212 provides a takeover notification message to the transportation means 130. The takeover notification message indicates takeover related information, including but not limited to, one or more of takeover start time, takeover end time, a takeover type, a takeover reason, and a takeover strategy.

Example Scenario of Map Update

It is discussed above that a perception message 202 and/or a decision planning message 204 may include map information, because a vehicle-mounted subsystem 232 needs to guide the driving of a transportation means depending on a map, especially a high-precision map, in the environment when performing a specific driving control. As mentioned above, map information may indicate at least one of an identification of a map, an update mode of a map, an area of a map to be updated, and location information. In some embodiments, a map update at the transportation means 130 may be that when a driving control module 234 on the vehicle side or a driving control module 214 on the roadside detects a map update need, and/or in response to a map update request from the transportation means 130, such as an OBU 232, a RSU 212 may make map information included in a generated perception message 202 and/or decision planning message 204. A map update request message may indicate time information, an identification of a transportation means 130, a type of a transportation means 130, descriptive information of a transportation means 130, location information of a transportation means 130, version information of a map, an area of a map to be updated, and an update mode of a map.

needed, the transportation means may be remotely driven by a person or any other operator at a distal end. For example, when the transportation means is required to complete a complex task, due to the limitations in the aspects of perception and processing of the transportation means, it is necessary to manually perform an automatic remote driving at a distal end. In such an implementation, the transportation means 130 may support a switching between a remote driving and an automatic driving.

Generally, a remote actuation mechanism may be provided, to simulate an actuation mechanism for realizing a driving on a general transportation means. An actuation mechanism may include components in one or more systems, such as a power system, a transmission system, a brake system, a steering system, and a feedback system of the transportation means. Such a remote actuation mechanism may be implemented based on software, and for example operated by a driving simulator or a graphical interface. Such a remote actuation mechanism may also be partially or completely implemented by hardware. When the transportation means 130 enters a remote-control mode, a driving

TABLE 5

Map Update Request Message (OBU->RSU)

| indication information | specific content | remarks |
| --- | --- | --- |
| time information | current moment | |
| identification information of a transportation means | identification | information capable of uniquely identifying a transportation means, such as a VIN code, a license plate number, etc. |
| | type | indicating a basic type of a transportation means; types of the transportation means may be classified according to different dimensions, e.g., transportation means classification standards, industry applications, power and/or driving modes; when transportation means are described, there may be multiple dimensions of information; |
| | geographical location | specific location of transportation means |
| | descriptive information | description of a size (e.g., length, width, height), a color, corner point data, a center point, a ground clearance, etc., of a transportation means; for example, the center point of a transportation means may be used as a reference to describe the length, width and height; or corner points may be used for description (corner point data may still be described with location information) |
| map version information | map version | indicating a version currently used by transportation means |
| area of a map to be updated | geographical area | indicating a geographical area of a map to be updated |
| map update mode | indication of an update mode | an update mode of a map may indicate, for example, an update source (from a remote device or other external sources), an update link, update time, etc., of a map |

Although some examples of the content contained in a map update request message are listed above, it should be understood that the map update request message may further include other content, including less or more content. In each communication, the map update request message provided from a vehicle-mounted subsystem 132 to a roadside subsystem 112 may be all or part of the above content in Table 4, or it may include other content. During transmission, a map update request message or constituent elements therein may be, for example, data-compressed, to further reduce the amount of data transmitted between the roadside and the transportation means.

Example Scenario of Remote Driving

In some embodiments, transportation means 130 having an automatic driving capability may be monitored in a running process based on remote information, and as operation on a remote actuation mechanism is synchronized to a local actuation mechanism of the transportation means 130. That is to say, the driving operation on the transportation means 130 is initiated and controlled by the remote actuation mechanism, and it is mapped to the local actuation mechanism. An actuation operation on a remote actuation mechanism may be actuated, for example, by a person or any other operator. Such a remote control may be initiated, for example, when the transportation means 130 cannot perform a driving control by itself or it is in a stagnant state.

In some embodiments, if necessary, a remote actuation mechanism or a terminal device at the remote actuation mechanism may initiate a remote driving request message for the transportation means 130. The remote driving request message may indicate start time and/or end time and/or a start location and/or an end location of a remote driving, and the message further includes time information. The remote driving request message may be sent, for example, to a roadside device 110, such as a roadside subsystem 112. A RSU 212 of the roadside subsystem 112 may send the remote driving request message to an OBU 232 of a vehicle-mounted subsystem 132.

Upon reception of a permission or acknowledgement of a remote driving from the vehicle-mounted subsystem 132 of the transportation means 130, the roadside device 110 may initiate a control message 206 based on the remote driving. Specifically, the roadside subsystem 112 determines a remote actuation operation on the remote actuation mechanism associated with the transportation means 130, and may convert the remote actuation operation into the control message 206 based on parameters related to the local actuation mechanism of the transportation means 130, to control a local actuation mechanism to actuate a same operation as the remote actuation operation. The parameters related to the local actuation mechanism of the transportation means 130 may be obtained, for example, from storage means of the remote device 120 or directly from the vehicle-mounted subsystem 132.

In some embodiments, if it is determined that a remote driving is ended, the roadside subsystem 112 may provide an indication of the end of the remote driving to the vehicle-mounted subsystem 132 of the transportation means 130. At this time, the transportation means 130 returns to a normal driving mode.

Example Method

Figure 4:
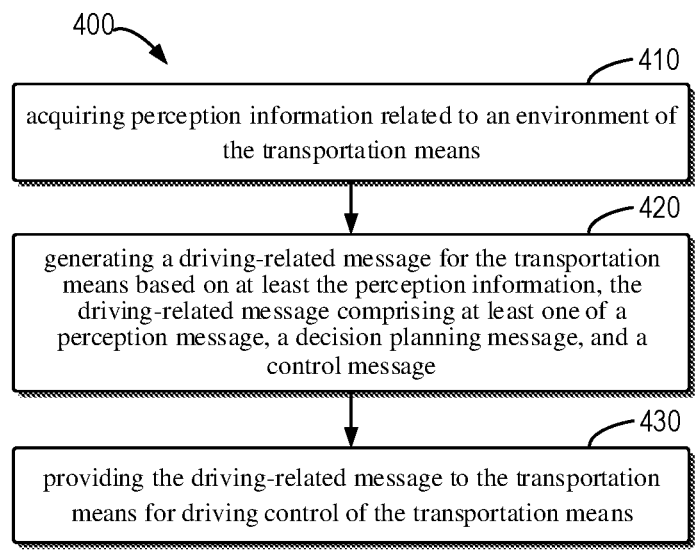
FIG. 4 is a flowchart showing a driving control method on a roadside according to some embodiments of the present disclosure.

FIG. 4 is a flowchart showing a driving control method 400 according to an embodiment of the present disclosure. The method 400 may be implemented at a roadside subsystem 112 in FIG. 1 and FIG. 2. It should be understood that although shown in a specific order, some steps in the method 400 may be performed in a different order than that shown or in a parallel manner. Embodiments of the present disclosure are not limited in this respect.

At 410, perception information related to an environment of the transportation means is acquired, the perception information includes at least information related to an object present in the environment. At 420, a driving-related message for the transportation means is generated based on at least the perception information, the driving-related message includes at least one of perception messages, a decision planning message, and a control message. At 430, the driving-related message is provided to the transportation means for driving control of the transportation means.

In some embodiments, acquiring the perception information includes acquiring at least one of: roadside perception information sensed by a sensing device which is arranged in the environment and independent of the transportation means; transportation means perception information sensed by a sensing device arranged in association with the transportation means; and transportation means perception information sensed by a sensing device arranged in association with another transportation means.

In some embodiments, the perception message includes at least one of: information related to an obstacle present in the environment, for indicating at least one of a type, location information, speed information, direction information, physical appearance descriptive information, a historical trajectory, and a predicted trajectory of the obstacle; information related to a physical condition of a road in the environment, for indicating at least one of a road surface physical condition of the road and structured information of the road; information related to a traffic facility in the environment, for indicating at least one of a state of a signal light and a traffic sign on the road; information related to a road traffic condition in the environment, for indicating at least one of a sign, traffic flow and a traffic event on the road and/or in a lane of the road; information related to a weather condition in the environment; auxiliary information related to positioning of the transportation means; diagnosis information of a failure of the transportation means; information related to an OTA upgrade of a software system of the transportation means; map information, indicating at least one of an identification of a map, an update mode of the map, an area of the map to be updated and location information; information related to a parking area of the transportation means; and time information.

In some embodiments, the decision planning message includes at least one of: an indication of a travel road on which a decision is to be applied, start time information and/or end time information of a decision plan, start location information and/or end location information of the decision plan, an identification of a transportation means targeted by the decision plan, decision information related to a driving behavior of the transportation means, decision information related to a driving action of the transportation means, information of a path planning trajectory point, expected time for arriving at the path planning trajectory point, information related to other transportation means involved in the decision plan, map information, indicating at least one of an identification of a map, an update mode of the map, an area of the map to be updated and location information, and time information.

In some embodiments, the control message includes at least one of: kinematic control information related to a motion of the transportation means, kinetic control information related to at least one of a power system, a transmission system, a brake system, and a steering system of the transportation means, control information related to a ride experience of a passenger in the transportation means, control information related to a traffic warning system of the transportation means, and time information.

In some embodiments, generating the driving-related message includes: generating at least one of the perception message and the decision plan message including map information used by the transportation means, in response to detecting that the map information is to be updated and/or in response to acquiring a map update request message from the transportation means, wherein the map update request message indicates at least one of time information, identification information of the transportation means, an area of a map to be updated, and an update mode of the map.

In some embodiments, generating the driving-related message further includes: acquiring at least one of real-time running information, auxiliary plan information and vehicle body information of the transportation means, and special transportation means indication information, and generating at least one of the decision planning message and the control message based on the acquired information.

In some embodiments, the real-time running information includes at least one of location information, traveling direction information, traveling route information, traveling speed information, operation state information, and component state information of the transportation means. In some embodiments, the auxiliary planning information includes at least one of an indication of traveling intention, planned traveling route information, and speed limit information of the transportation means. In some embodiments, the vehicle body information includes at least one of an identification, a type, descriptive information, current traveling route information, and failure-related information of the transportation means. In some embodiments, the special transportation means indication information includes at least one of a special transportation means type and a right-of-way requirement level.

In some embodiments, providing the driving-related message includes: providing the driving-related message to the transportation means, in response to at least one of a time-based trigger, a location-based trigger, and an event-based trigger.

In some embodiments, providing the driving-related message includes: receiving a takeover request message for the transportation means, the takeover request message indicating a request for at least partially taking over the driving control of the transportation means; and providing at least one of the decision planning message, and the control message to the transportation means, in response to the takeover request message.

In some embodiments, the takeover request message indicates at least one of identification information of the transportation means, travelling plan information of the transportation means, a reason for requesting takeover, and time information.

In some embodiments, the method 400 further includes: providing a takeover notification message to the transportation means, in response to determining that the driving control of the transportation means is to be at least partially taken over, the takeover notification message indicating at least one of start time of the takeover, end time of the takeover, a type of the takeover, a reason of the takeover, and a strategy of the takeover.

In some embodiments, the method 400 further includes: generating at least one of another decision planning message and another control message based on the perception information, in response to determining that the driving control of the transportation means requires an assistance of another transportation means; and providing at least one of the generated another decision planning message and the generated another control message to the other transportation means for driving control of the other transportation means.

In some embodiments, generating the driving-related message includes: determining a remote execution operation on a remote execution mechanism associated with the transportation means; converting the remote execution operation into the control message further based on a parameter related to a local execution mechanism of the transportation means, to control the local execution mechanism to execute a same operation as the remote execution operation.

Figure 5:
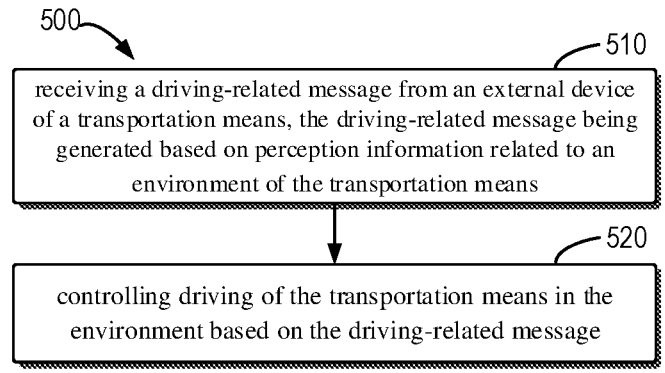
FIG. 5 is a flowchart showing a method for driving control on a vehicle side according to some embodiments of the present disclosure.

FIG. 5 is a flowchart showing a driving control method 500 according to an embodiment of the present disclosure. The method 500 may be implemented at a vehicle-mounted subsystem 132 in FIG. 1 and FIG. 2. It should be understood that although shown in a specific order, some steps in the method 500 may be performed in a different order than that shown or in a parallel manner. Embodiments of the present disclosure are not limited in this respect.

At 510, a driving-related message is received from an external device of the transportation means, the driving-related message being generated based on perception information related to an environment of the transportation means, and including at least one of a perception message, a decision planning message, and a control message. At 520, driving of the transportation means in the environment is controlled based on the driving-related message.

In some embodiments, the method 500 further includes: providing, to the external device, transportation means perception information sensed by a sensing device arranged in association with the transportation means as at least a part of the perception information.

In some embodiments, the method 500 further includes: providing, to the external device, at least one of real-time running information, auxiliary planning information and vehicle body information of the transportation means, and special transportation means indication information, for a generation of at least one of the decision planning message and the control message.

In some embodiments, receiving the driving-related message includes: providing, to the external device, a takeover request message for the transportation means, the takeover request message indicating a request for at least partially taking over the driving control of the transportation means; and receiving at least one of the decision planning message, and the control message, in response to the takeover request message. In some embodiments, the takeover request message indicates at least one of identification information of the transportation means, travelling plan information of the transportation means, a reason for requesting takeover, and time information.

In some embodiments, the method 500 further includes: receiving a takeover notification message for the takeover request message from the external device, the takeover notification message indicating at least one of start time of the takeover, end time of the takeover, a type of the takeover, a reason of the takeover, and a strategy of the takeover.

In some embodiments, receiving the driving-related message includes: providing, to the external device, a remote driving request message for the transportation means; and receiving the control message in response to the remote driving request message, the control message including a control instruction executable by a local execution mechanism of the transportation means, and the control message being obtained by performing a conversion of an execution operation on a remote execution mechanism based on a parameter related to the local execution mechanism.

Example Apparatus and Device

Figure 6:
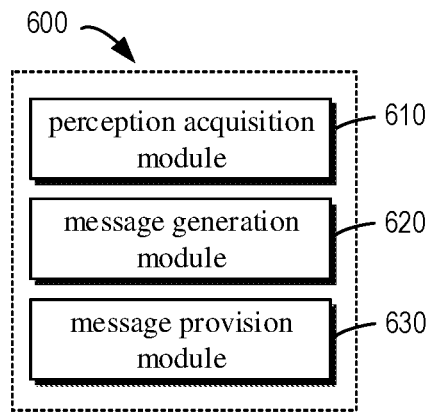
FIG. 6 is a schematic block diagram showing a driving control apparatus on a roadside according to some embodiments of the present disclosure.

FIG. 6 is a schematic block diagram showing a driving control apparatus 600 according to an embodiment of the present disclosure. The apparatus 600 may be included in a roadside subsystem 112 in FIG. 1 and FIG. 2 or implemented as a roadside subsystem 112. As shown in FIG. 6, the apparatus 600 includes a perception acquisition module 610, configured to acquire, by an external device of a transportation means, perception information related to an environment of transportation means, the perception information including at least information related to an object present in the environment; a message generation module 620, configured to generate a driving-related message for the transportation means based on at least the perception information, the driving-related message including at least one of a perception message, a decision planning message, and a control message; and a message provision module 630, configured to provide the driving-related message to the transportation means for driving control of the transportation means.

In some embodiments, the perception acquisition module is configured to acquire at least one of: roadside perception information sensed by a sensing device which is arranged in the environment and independent of the transportation means; transportation means perception information sensed by a sensing device arranged in association with the transportation means; and transportation means perception information sensed by a sensing device arranged in association with another transportation means.

In some embodiments, the message generation module includes: a map update-based message generation module, configured to generate at least one of the perception message and the decision planning message including map information, in response to detecting that the map information is to be updated and/or in response to acquiring a map update request message from the transportation means. In some embodiments, the map update request message indicates at least one of time information, identification information of the transportation means, an area of a map to be updated, and an update mode of the map.

In some embodiments, the message generation module further includes: an auxiliary information acquisition module, configured to acquire at least one of real-time running information, auxiliary planning information and vehicle body information of the transportation means, and special transportation means indication information; and an auxiliary information-based message generation module configured to further generate at least one of the decision plan message and the control message based on the acquired information.

In some embodiments, the message provision module is configured as: a trigger-based message provision module configured to provide the driving-related message to the transportation means, in response to at least one of a time-based trigger, a location-based trigger, and an event-based trigger.

In some embodiments, the message provision module includes: a takeover request receiving module, configured to receive a takeover request message for the transportation means, the takeover request message indicating a request for at least partially taking over the driving control of the transportation means; and a takeover request-based message provision module, configured to provide at least one of the decision planning message, and the control message to the transportation means, in response to the takeover request message.

In some embodiments, the apparatus 600 further includes: a notification provision module, configured to provide a takeover notification message to the transportation means, in response to determining that the driving control of the transportation means is to be at least partially taken over, the takeover notification message indicating at least one of: start time of the takeover, end time of the takeover, a type of the takeover, a reason of the takeover, and a strategy of the takeover.

In some embodiments, the apparatus 600 further includes: another message generation module, configured to generate at least one of another decision planning message and another control message based on the perception information, in response to determining that the driving control of the transportation means requires an assistance of another transportation means; and another message provision module, configured to provide at least one of the generated another decision planning message and the generated another control message to the other transportation means for driving control of the other transportation means.

In some embodiments, the message generation module includes: an operation determination module, configured to determine a remote execution operation on a remote execution mechanism associated with the transportation means; a conversion-based message generation module, configured to convert the remote execution operation into the control message further based on a parameter related to a local execution mechanism of the transportation means, to control the local execution mechanism to execute a same operation as the remote execution operation.

Figure 7:
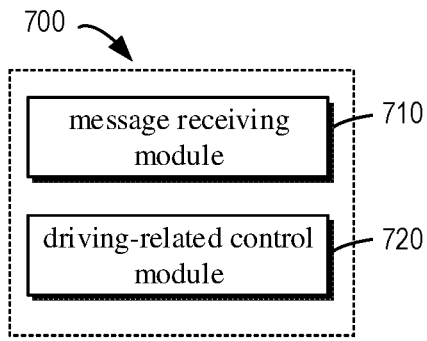
FIG. 7 is a schematic block diagram showing a driving control apparatus on a vehicle side according to some embodiments of the present disclosure.

FIG. 7 is a schematic block diagram showing a driving control apparatus 700 according to an embodiment of the present disclosure. The apparatus 700 may be included in a vehicle-mounted subsystem 132 in FIG. 1 and FIG. 2 or implemented as a vehicle-mounted subsystem 132. As shown in FIG. 7, the apparatus 700 includes a message receiving module 710, configured to receive a driving-related message from an external device of a transportation means, the driving-related message being generated based on perception information related to an environment of the transportation means, and including at least one of a perception message, a decision planning message, and a control message; and a driving-related control module 720, configured to control driving of the transportation means in the environment based on the driving-related message.

In some embodiments, the apparatus 700 further includes a perception provision module, configured to provide, to the external device, transportation means perception information sensed by a sensing device arranged in association with the transportation means as at least a part of the perception information.

In some embodiments, the apparatus 700 further includes an auxiliary information provision module, configured to provide, to the external device, at least one of real-time running information, auxiliary planning information and vehicle body information of the transportation means, and special transportation means indication information, for a generation of at least one of the decision planning message and the control message.

In some embodiments, the message receiving module includes: a takeover request provision module, configured to provide, to the external device, a takeover request message for the transportation means, the takeover request message indicating a request for at least partially taking over the driving control of the transportation means; and a takeover-based message receiving module, configured to receive at least one of the decision planning message, and the control message, in response to the takeover request message. The takeover request message indicates at least one of identification information of the transportation means, travelling plan information of the transportation means, a reason for requesting takeover, and time information.

In some embodiments, the apparatus 700 further includes a notification receiving module, configured to receive a takeover notification message for the takeover request message from the external device, the takeover notification message indicating at least one of start time of the takeover, end time of the takeover, a type of the takeover, a reason of the takeover, and a strategy of the takeover.

In some embodiments, receiving the driving-related message further includes: a remote driving request module, configured to provide, to the external device, a remote driving request message for the transportation means; and a control message receiving module, configured to receive the control message in response to the remote driving request message, the control message including a control instruction executable by a local execution mechanism of the transportation means, and the control message being obtained by performing a conversion of an execution operation on a remote execution mechanism based on a parameter related to the local execution mechanism.

Figure 8:
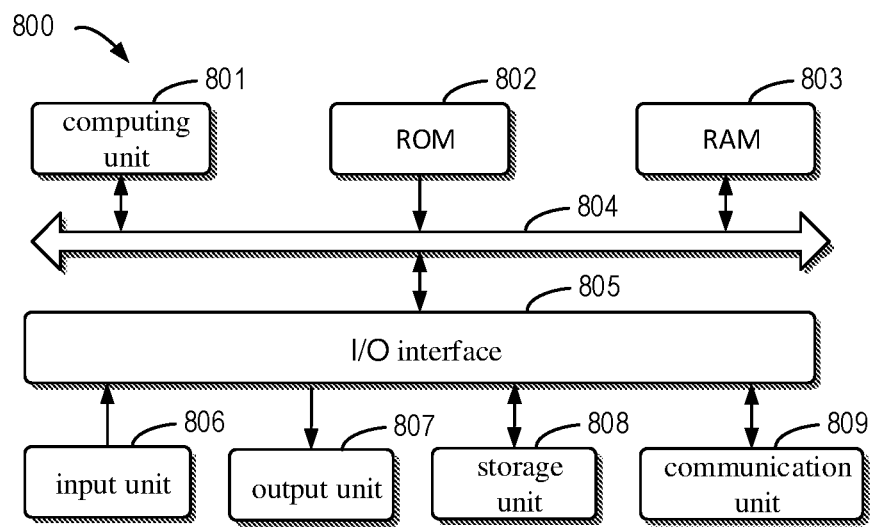
FIG. 8 is a block diagram showing a device capable of implementing a plurality of embodiments of the present disclosure.

FIG. 8 is a schematic block diagram showing an example device 800 that may be used to implement embodiments of the present disclosure. The device 800 may be used to implement the roadside subsystem 112 or the vehicle-mounted subsystem 132 of FIG. 1 and FIG. 2. As shown in FIG. 8, the device 800 includes a computing unit 801, which may perform various appropriate actions and processing according to computer program instructions stored in a Read Only Memory (ROM) 802 or loaded from a storage unit 808 to a Random Access Memory (RAM) 803. In the RAM 803, various programs and data required for the operation of the device 800 may also be stored. The computing unit 801, the ROM 802, and the RAM 803 are connected to each other through a bus 804. An input/output (I/O) interface 805 is also connected to the bus 804.

A plurality of components in the device 800 are connected to the I/O interface 805, including: an input unit 806, such as a keyboard, a mouse; an output unit 807, such as various types of displays, speakers; a storage unit 808, such as a magnetic disk, an optical disk; and a communication unit 809, such as a network card, a modem, a wireless communication transceiver. The communication unit 809 allows the device 800 to exchange information/data with other devices through a computer network, such as the Internet and/or various telecommunication networks.

The computing unit 801 may be various general and/or dedicated processing components with processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, and a digital signal processor (DSP), and any appropriate processor, controller, microcontroller, etc. The computing unit 801 executes various methods and processing described above such as the method 800. For example, in some embodiments, the method 400 or the method 500 may be implemented as a computer software program, which is tangibly contained in a machine-readable medium, such as the storage unit 808. In some embodiments, the computer program may be partially or fully loaded and/or installed on the device 800 via the ROM 802 and/or the communication unit 809. When the computer program is loaded into the RAM 803 and executed by the computing unit 801, one or more steps of the method 400 or the method 500 described above may be performed. Alternatively, in other embodiments, the computing unit 801 may be configured to execute the method 400 or the method 500 in any other suitable manner (e.g., by means of firmware).

Functions described above may be performed at least in part by one or more hardware logic components. For example, non-restrictively, exemplary types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), etc.

Program codes for implementing the method of the present disclosure may be drafted in one or combinations of a plurality of programming languages. These program codes may be provided to a processor or a controller of a general computer, a dedicated computer, or other programmable data processing means, so that when the program codes are executed by the processor or the controller, functions and/or operations specified in a flowchart and/or a block diagram are implemented. The program codes may be entirely executed on a machine, partially executed on a machine, partially executed on a machine as an independent software package and partially executed on a remote machine, or entirely executed on a remote machine or a server.

In the context of the present disclosure, a machine-readable medium may be a tangible medium, which may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of those aforementioned. More specific examples of the machine-readable storage medium would include an electrical connection based on one or more wires, a portable computer disk, a hard disk, a Random Access Memory (RAM), a Read-Only Memory (ROM), an Erasable Programmable Read-Only Memory (EPROM or flash memory), optical fiber, a Portable Compact Disk Read-Only Memory (CD-ROM), an optical storage device, a magnetic storage device, or any suitable combination of those aforementioned.

In addition, although operations are depicted in a specific order, it should be understood that such operations are required to be performed in the shown specific order or in sequence, or all the shown operations are required to be performed to obtain desired results. Under a certain environment, multitasking and parallel processing may be advantageous. Likewise, although several specific implementation details are contained in the above discussion, these should not be construed as limitations of the scope of the present disclosure. Certain features that are described in the context of an individual embodiment may also be implemented in combination in an individual implementation. Conversely, various features that are described in the context of an individual implementation may also be implemented in a plurality of implementations individually or in any suitable sub-combination.

Although the subject matter has been described in languages specific to structural features and/or logical actions of the method, it should be understood that the subject matter defined in the appended claims is not necessarily limited to the specific features or actions described above. On the contrary, the specific features and actions described above are merely exemplary forms for implementing the claims.

What is claimed is:

1. A driving control method, comprising:
  acquiring, by an external device independent of a transportation means, perception information related to an environment of the transportation means, the perception information comprising at least information related to an object present in the environment;
  generating a driving-related message for the transportation means based on at least the perception information, the driving-related message comprising at least one of a perception message, a decision planning message, and a control message; and
  providing the driving-related message to the transportation means for driving control of the transportation means,
  wherein providing the driving-related message comprises:
    receiving, by the external device, a takeover request message for the transportation means, the takeover request message indicating a request for at least partially taking over the driving control of the transportation means; and providing, by the external device, at least one of the decision planning message, and the control message to the transportation means, in response to the takeover request message.

2. The method according to claim 1, wherein acquiring the perception information comprises acquiring at least one of:
roadside perception information sensed by a sensing device which is arranged in the environment and independent of the transportation means;
transportation means perception information sensed by a sensing device arranged in association with the transportation means; and
transportation means perception information sensed by a sensing device arranged in association with another transportation means.

3. The method according to claim 1, wherein the perception message comprises at least one of:
information related to an obstacle present in the environment, for indicating at least one of a type, location information, speed information, direction information, physical appearance descriptive information, a historical trajectory, and a predicted trajectory of the obstacle;
information related to a physical condition of a road in the environment, for indicating at least one of a road surface physical condition of the road and structured information of the road;
information related to a traffic facility in the environment, for indicating at least one of a state of a signal light and a traffic sign on the road;
information related to a road traffic condition in the environment, for indicating at least one of a sign, traffic flow and a traffic event on the road and/or in a lane of the road;
information related to a weather condition in the environment;
auxiliary information related to positioning of the transportation means;
diagnosis information on a failure of the transportation means;
information related to an Over-The-Air upgrade of a software system of the transportation means;
map information, indicating at least one of an identification of a map, an update mode of the map, an area of the map to be updated and location information of the area;
information related to a parking area of the transportation means; and
time information.

4. The method according to claim 1, wherein the decision planning message comprises at least one of:
an indication of a traveling road on which a decision is to be applied,
start time information and/or end time information of a decision plan,
start location information and/or end location information of the decision plan,
an identification of a transportation means targeted by the decision plan,
decision information related to a driving behavior of the transportation means,
decision information related to a driving action of the transportation means,
information of a path planning trajectory point,
expected time for arriving at the path planning trajectory point,
information related to other transportation means involved in the decision plan,
map information, indicating at least one of an identification of a map, an update mode of the map, an area of the map to be updated, and location information of the area, and
time information.

5. The method according to claim 1, wherein the control message comprises at least one of:
kinematic control information related to a motion of the transportation means,
kinematic control information related to at least one of a power system, a transmission system, a brake system, and a steering system of the transportation means,
control information related to a ride experience of a passenger in the transportation means,
control information related to a traffic warning system of the transportation means, and
time information.

6. The method according to claim 1, wherein generating the driving-related message comprises:
generating at least one of the perception message and the decision planning message comprising map information used by the transportation means, in response to detecting that the map information is to be updated and/or in response to acquiring a map update request message from the transportation means,
wherein the map update request message indicates at least one of time information, identification information of the transportation means, an area of a map to be updated, and an update mode of the map.

7. The method according to claim 1, wherein generating the driving-related message further comprises:
acquiring at least one of real-time running information, auxiliary planning information and vehicle body information of the transportation means, and special transportation means indication information; and
generating at least one of the decision planning message and the control message based on the acquired information.

8. The method according to claim 7, wherein the real-time running information comprises at least one of location information, traveling direction information, traveling route information, traveling speed information, operation state information, and component state information of the transportation means;
wherein the auxiliary planning information comprises at least one of an indication of traveling intention, planned traveling route information, and speed limit information of the transportation means;
wherein the vehicle body information comprises at least one of an identification, a type, descriptive information, current traveling route information, and failure-related information of the transportation means; and
wherein the special transportation means indication information comprises at least one of a special transportation means type and a right-of-way requirement level.

9. The method according to claim 1, wherein providing the driving-related message comprises:
providing the driving-related message to the transportation means, in response to at least one of a time-based trigger, a location-based trigger, and an event-based trigger.

10. The method according to claim 1, wherein the takeover request message indicates at least one of identification information of the transportation means, travelling plan information of the transportation means, a reason for requesting takeover, and time information.

11. The method according to claim 1, further comprising:
providing a takeover notification message to the transportation means, in response to determining that the driving control of the transportation means is to be at least partially taken over, the takeover notification message indicating at least one of start time of the takeover, end time of the takeover, a type of the takeover, a reason of the takeover, and a strategy of the takeover.

12. The method according to claim 1, further comprising:
generating at least one of another decision planning message and another control message based on the perception information, in response to determining that the driving control of the transportation means requires an assistance of another transportation means; and
providing at least one of the generated another decision planning message and the generated another control message to the other transportation means for driving control of the other transportation means.

13. The method according to claim 1, generating the driving-related message comprises:
determining a remote execution operation on a remote execution mechanism associated with the transportation means; and
converting the remote execution operation into the control message further based on a parameter related to a local execution mechanism of the transportation means, to control the local execution mechanism to execute a same operation as the remote execution operation.

14. A driving control method, comprising:
receiving a driving-related message from an external device independent of a transportation means, the driving-related message being generated based on perception information related to an environment of the transportation means, and comprising at least one of a perception message, a decision planning message, and a control message; and
controlling driving of the transportation means in the environment based on the driving-related message,
wherein receiving the driving-related message comprises:
providing, to the external device, a takeover request message for the transportation means, the takeover request message indicating a request for at least partially taking over the driving control of the transportation means; and
receiving at least one of the decision planning message, and the control message, in response to the takeover request message,
and wherein the takeover request message indicates at least one of identification information of the transportation means, travelling plan information of the transportation means, a reason for requesting takeover, and time information.

15. The method according to claim 14, further comprising:
providing, to the external device, transportation means perception information sensed by a sensing device arranged in association with the transportation means as at least a part of the perception information.

16. The method according to claim 14, further comprising:
providing, to the external device, at least one of real-time running information, auxiliary planning information and vehicle body information of the transportation means, and special transportation means indication information, for a generation of at least one of the decision planning message and the control message.

17. The method according to claim 16, wherein the real-time running information comprises at least one of location information, traveling direction information, traveling route information, traveling speed information, operation state information, and component state information of the transportation means;
wherein the auxiliary planning information comprises at least one of an indication of traveling intention, planned traveling route information, and speed limit information of the transportation means;
wherein the vehicle body information comprises at least one of an identification, a type, descriptive information, current traveling route information, and failure-related information of the transportation means; and
wherein the special transportation means indication information comprises at least one of a special transportation means type and a right-of-way requirement level.

18. An electronic device, which is independent of a transportation means, comprising:
one or more processors; and
a storage device for storing one or more programs, wherein the one or more programs, when being executed by the one or more processors, enable the one or more processors to:
acquire perception information related to an environment of the transportation means, the perception information comprising at least information related to an object present in the environment;
generate a driving-related message for the transportation means based on at least the perception information, the driving-related message comprising at least one of a perception message, a decision planning message, and a control message; and
provide the driving-related message to the transportation means for driving control of the transportation means,
wherein providing the driving-related message comprises:
receiving a takeover request message for the transportation means, the takeover request message indicating a request for at least partially taking over the driving control of the transportation means; and
providing at least one of the decision planning message, and the control message to the transportation means, in response to the takeover request message.

19. An electronic device, comprising:
one or more processors; and
a storage device for storing one or more programs, wherein the one or more programs, when being executed by the one or more processors, enable the one or more processors to:
receive a driving-related message from an external device independent of a transportation means, the driving-related message being generated based on perception information related to an environment of the transportation means, and comprising at least one of a perception message, a decision planning message, and a control message; and
control driving of the transportation means in the environment based on the driving-related message,
wherein receiving the driving-related message comprises:
providing, to the external device, a takeover request message for the transportation means, the takeover request message indicating a request for at least partially taking over the driving control of the transportation means; and
receiving at least one of the decision planning message, and the control message, in response to the takeover request message, and wherein the takeover request message indicates at least one of identification information of the transportation means, travelling plan information of the transportation means, a reason for requesting takeover, and time information.

* * * * *